US00RE39424E

(19) United States
(12) Reissued Patent
Moskovich

(10) Patent Number: US RE39,424 E
(45) Date of Reissued Patent: Dec. 12, 2006

(54) TELECENTRIC LENS SYSTEMS FOR FORMING AN IMAGE OF AN OBJECT COMPOSED OF PIXELS

(75) Inventor: Jacob Moskovich, Cincinnati, OH (US)

(73) Assignee: 3M Innovative Properties Company, St. Paul, MN (US)

(21) Appl. No.: 09/305,780

(22) Filed: Apr. 28, 1999

Related U.S. Patent Documents

Reissue of:
(64) Patent No.: 5,625,495
Issued: Apr. 29, 1997
Appl. No.: 08/350,652
Filed: Dec. 7, 1994

(51) Int. Cl.
*G02B 13/22* (2006.01)

(52) U.S. Cl. ..... 359/663; 359/649
(58) Field of Classification Search ..... 359/649, 359/663, 676
See application file for complete search history.

(56) References Cited

U.S. PATENT DOCUMENTS

| | | | | | |
|---|---|---|---|---|---|
| 706,650 | A | * | 8/1902 | Goerz | 359/794 |
| 2,031,792 | A | * | 2/1936 | Richter | 359/737 |
| 3,947,094 | A | * | 3/1976 | Ikemori | 359/751 |
| 4,025,169 | A | * | 5/1977 | Fischer et al. | 359/744 |
| 4,046,459 | A | * | 9/1977 | Kawamura | 359/751 |
| 4,189,211 | A | * | 2/1980 | Taylor | 359/663 |
| 4,425,028 | A | * | 1/1984 | Gagnon et al. | 359/246 |
| 4,441,792 | A | * | 4/1984 | Tateoka | 359/663 |
| 4,461,542 | A | * | 7/1984 | Gagnon | 349/8 |
| 4,511,223 | A | * | 4/1985 | Hirose | 362/268 |
| 4,637,690 | A | * | 1/1987 | Miyamae et al. | 359/683 |
| 4,826,311 | A | * | 5/1989 | Ledebuhr | 353/31 |
| 4,913,540 | A | * | 4/1990 | Minefuji | 359/663 |
| 4,925,279 | A | * | 5/1990 | Shirota | 359/206 |
| 5,159,496 | A | | 10/1992 | Kataoka | |
| 5,172,275 | A | | 12/1992 | DeJager | |
| 5,200,861 | A | * | 4/1993 | Moskovich | 359/662 |
| 5,210,646 | A | | 5/1993 | Mercado et al. | |
| 5,218,480 | A | * | 6/1993 | Moskovich | 359/753 |
| 5,313,330 | A | * | 5/1994 | Betensky | 359/676 |
| 5,390,048 | A | | 2/1995 | Miyatake et al. | |
| 5,539,579 | A | | 7/1996 | Miyatake et al. | |

FOREIGN PATENT DOCUMENTS

| | | | |
|---|---|---|---|
| DE | 42 08 635 | | 7/1993 |
| EP | 311116 | * | 4/1989 |
| EP | 373677 | * | 6/1990 |
| JP | 0266512 | * | 11/1987 |
| JP | 0096709 | * | 4/1990 |
| JP | 404013108 | * | 1/1992 |
| JP | 4(1992)-335610 | | 11/1992 |
| JP | 5(1993)-150158 | | 6/1993 |
| JP | 5(1993)-150159 | | 6/1993 |
| JP | 6-317742 | * | 11/1994 |
| JP | 7-(1995)-077652 | | 3/1995 |
| SU | 603938 | * | 4/1978 |
| SU | 1007068 | * | 3/1983 |
| SU | 1048444 | * | 10/1983 |
| SU | 1089535 | * | 4/1984 |

OTHER PUBLICATIONS

Translation of Patent Publication No. 6–317742 (Japan; Nov. 1994).*

(Continued)

*Primary Examiner*—Scott J. Sugarman
(74) *Attorney, Agent, or Firm*—Maurice M. Klee; George W. Jonas

(57) ABSTRACT

Telecentric lens systems for use with pixelized panels, such as LCD or DMD panels, are provided. The systems have a long aperture stop to object distance (ASOD) and a high level of aberration correction, including a high level of lateral color correction. Preferably, the systems also have a low f-number and are wide angle. The systems include a negative first unit which produces the long ASOD, a weak second unit which includes two meniscus elements which surround the system's aperture stop, and a positive third unit which images the aperture stop to form the system's telecentric pupil.

56 Claims, 16 Drawing Sheets

OTHER PUBLICATIONS

Hoogland, J., "The Design of Apochromatic Lenses," *Recent Development in Optical Design,* R.A. Ruhloff editor, Perkin–Elmer Corporation, Norwalk, CT, 1968, pp. 6–1 to 6–7.

(Anonymous), "Colour corrected and temperature stabilized projection lens," *Research Disclosure,* No. 350, Jun. 1993, Emsworth GB, 370–371.

Hoya Corporation's catalog entitled "Optical Glass," Section 2.4, 1984.

Schott Glass Technologies's catalog entitled "Schott Optical Glass," Section 2.2, 1992.

* cited by examiner

TELECENTRIC LENS SYSTEMS FOR FORMING AN IMAGE OF AN OBJECT COMPOSED OF PIXELS

Matter enclosed in heavy brackets [ ] appears in the original patent but forms no part of this reissue specification; matter printed in italics indicates the additions made by reissue.

FIELD OF THE INVENTION

This invention relates to telecentric lens systems and, in particular, to systems of this type which can be used, inter alia, to form an image of an object composed of pixels, such as, a liquid crystal display (LCD) or a discrete mirror device (DMD). In certain embodiments, the lens systems have a long aperture stop to object distance (ASOD), a high level of aberration correction, a large aperture, and a wide field of view. The invention further relates to the use of such lens systems in projection televisions, e.g., rear projection televisions, in which an image of an LCD, DMD, or other pixelized panel is projected onto a viewing screen.

BACKGROUND OF THE INVENTION

Projection television systems employing LCDs or DMDs are currently under development for use as, among other things, computer monitors. Such projection televisions preferably employ a single lens system which forms an image of either a single panel having, for example, red, green, and blue pixels, or three individual panels, one for each color.

In either case, and, in particular, in the three panel case, the lens system normally needs to have a long aperture stop to object distance (ASOD) to accommodate the optical elements, e.g., filters, beam splitters, prisms, and the like, used in combining the light from the different color optical paths which the lens system projects towards the viewing screen.

The illumination of a pixelized panel plays an important role in the performance of projection TVs employing such panels. In particular, it is important to match the location and size of the exit pupil of the illumination system with the entrance pupil of the lens system to obtain a bright, uniformly-illuminated image on the TV screen. Since illumination optics generally work best when the exit pupil is located a long distance from the light source, it is desirable to use a projection lens system with a long entrance pupil distance. Also, LCD panels work best when light passes through them at small angles.

Telecentric lens systems are systems which have at least one pupil at infinity. In terms of principal rays, having a pupil at infinity means that the principal rays are parallel to the optical axis (a) in object space, if the entrance pupil is at infinity, or (b) in image space, if the exit pupil is at infinitum. Since light can propagate through a lens system in either direction, the pupil at infinity can serve as either an entrance or an exit pupil depending upon the system's orientation with respect to the object and the image. Accordingly, the term "telecentric pupil" will be used herein to describe the system's pupil at infinity, whether that pupil is functioning as an entrance or an exit pupil.

In practical applications, the telecentric pupil need not actually be at infinity since a lens system having an entrance or exit pupil at a sufficiently large distance from the system's optical surfaces will in essence operate as a telecentric system. The principal rays for such a system will be substantially parallel to the optical axis and thus the system will in general be functionally equivalent to a system for which the theoretical (Gaussian) location of the pupil is at infinity.

Accordingly, as used herein, the term "telecentric lens system" is intended to include lens systems which have at least one pupil at a long distance from the lens elements, and the term "telecentric pupil" is used to describe such a pupil at a long distance from the lens elements. For the lens systems of the invention, the telecentric pupil distance will in general be at least about 10 times the system's focal length.

In addition to having a long ASOD and a telecentric pupil, lens systems for use with pixelized panels generally need to have a high level of aberration correction, including lateral color correction. Lateral color, i.e., the variation of magnification with color, manifests itself as a decrease in contrast, especially at the edges of the field. In extreme cases, a rainbow effect in the region of the full field can be seen.

In projection televisions employing cathode ray tubes (CRTs) a small amount of (residual) lateral color can be compensated for electronically by, for example, reducing the size of the image produced on the face of the red CRT relative to that produced on the blue CRT. With pixelized panels, however, such an accommodation cannot be performed because the image is digitized and thus a smooth adjustment in size across the full field of view is not possible.

Accordingly, a higher level of lateral color correction is needed from the lens system. In particular, for a VGA computer monitor, the lateral color evaluated across the entire active surface of the pixelized panel(s) over the visual light spectrum should be less than about the diagonal of a pixel and preferably less than about ½ the diagonal of a pixel.

Pixelized panels and their use in computer monitor applications also lead to stringent requirements regarding the correction of distortion and the attainment of flat field imagery, i.e., the achieving of a high level of correction of the field curvature of the lens system. This is so because when viewing data displays, good image quality is required even at the extreme points of the field of view of the lens system. Similarly, it is also important to keep an even illumination level across the image of the pixelized panel, i.e., to maintain the smallest relative illumination fall-off possible due to vignetting in the lens system. Further, various illumination schemes may require lens systems having large numerical apertures, e.g., apertures corresponding to a f-number of 2 or faster.

For rear projection applications, it is desirable to have as small an overall package size (monitor size) as possible. In terms of the optics, this means that the imaging conjugates should be made as small as possible while still maintaining a large image size. This, in turn, means that the projection lens system should have a wide field of view, e.g., preferably a field of view whose half angle is at least about 25° or higher. A lens system having such a field of view is referred to herein as a "wide angle" system.

The lens systems described below address all the above requirements and can be successfully used in producing projection televisions and, in particular, computer monitors, where a high quality color image is required.

DESCRIPTION OF THE PRIOR ART

Lens systems for use -with projection television systems and, in particular, projection televisions using pixelized panels are describe in various patents and patent publications, including Moskovich, U.S. Pat. No. 5,200,861, and Moskovich, U.S. Pat. No. 5,218,480.

Discussions of LCD systems can be found in Taylor, U.S. Pat. No. 4,189,211, Gagnon et al., U.S. Pat. No. 4,425,028, Gagnon, U.S. Pat. No. 4,461,542, Ledebuhr, U.S. Pat. No. 4,826,311, Minefuji, U.S. Pat. No. 4,913,540, EPO Patent Publication No. 311,116, and Russian Patent Publication No. 1,007,068.

Discussions of telecentric lens systems can be found in Hirose, U.S. Pat. No. 4,511,223,. Miyamae et al., U.S. Pat. No. 4,637,690, Shirota, U.S. Pat. No. 4,925,279, Ikemori, U.S. Pat. No. 3,947,094, Tateoka, U.S. Pat. No. 4,441,792, EPO Patent Publication No. 373,677, and Russian Patent Publications Nos. 603,938, 1,048,444, and 1,089,535.

A objective lens-for a reflex camera employing two facing meniscus elements is disclosed in Fischer et al., U.S. Pat. No. 4,025,169. The lens of this patent is not suitable for use in producing color images from one or more pixelized panels because, :inter alia, the lens is not telecentric. Also, Fischer et al.'s aperture stop is not located between their facing meniscus elements as is the case in all of the lens systems of the present system.

SUMMARY OF THE INVENTION

In view of the foregoing, it is an object of the present invention to provide proved lens systems for use in projection televisions and, in particular, in computer monitors in which one or more pixeled panels are projected onto a viewing screen.

More particularly, it is an object of the invention to provide lens systems which have at least some, and preferably all, of the following properties: 1) a long ASOD for light traveling from right to left in the figures, i.e., an ASOD which is at least about 2.5 times the focal length (f) of the system, and preferably at least about 3.0 times f (note that as the ASOD/f ratio increases, it becomes more difficult to correct the aberrations of the lens system so as to produce an image suitable for use in displaying data on a computer monitor); 2) a telecentric pupil, i.e., an entrance pupil a long distance from the lens system for light traveling from right to left in the figures; 3) a high level of aberration correction, including correction of distortion, field curvature, and lateral color (note that with a pixelized panel, pincushion and barrel distortion cannot be corrected electronically as can be done to at least some extent in projection televisions that employ cathode ray tubes); 4) a large aperture, e.g., a f-number of about 2; and 5) a wide field of view, i.e., a field of view greater than about 25 degrees half or semi-field for light traveling from left to right in the figures.

To achieve the foregoing and other objects, the invention provides a telecentric lens system which includes the following three lens units in order from the long conjugate side to the short conjugate side of the system:

(1) a first lens unit which:
  (a) has a negative power; and
  (b) includes at least one negative lens element whose strongest surface is convex to the long conjugate side of the system;

(2) a second lens unit which:
  (a) is of weak optical power, i.e., the ratio of the absolute value of the focal length of the second lens unit to the focal length of the lens system is greater than about 1.5;
  (b) comprises two meniscus elements whose concave surfaces face each other; and
  (c) includes the lens system's aperture stop with the aperture stop being located between the meniscus elements; and (3) a third lens unit which:
  (a) has a positive power;
  (b) forms the system's telecentric pupil by imaging the aperture stop; and
  (c) includes means for correcting the chromatic aberrations of the lens system, including the lateral color of the system.

Preferred constructions for the three lens units are discussed below in connection with the Description of the Preferred Embodiments.

These drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, the lens systems of the present invention include three lens units, each of which includes at least one lens element.

I. The First Lens Unit

The first lens unit has a negative power and serves to provide the large ASOD needed to accommodate the optical path folding and/or combining means employed with pixelized panels. As illustrated in the figures, the lens systems of the invention have a large space on the short conjugate side of the system either between the elements of the system (FIGS. 1–8) or after those elements (FIGS. 9–15).

To minimize aberration contributions, the first lens unit includes at least one negative element, preferably the leading element of the unit, which has a strong surface facing away from (convex to) the system's long conjugate. The strong convex surface minimizes the angles of incidence and thus the contribution of the surface to the aberrations of the system. The negative element with the strong surface is preferably meniscus shaped.

Figure 1:
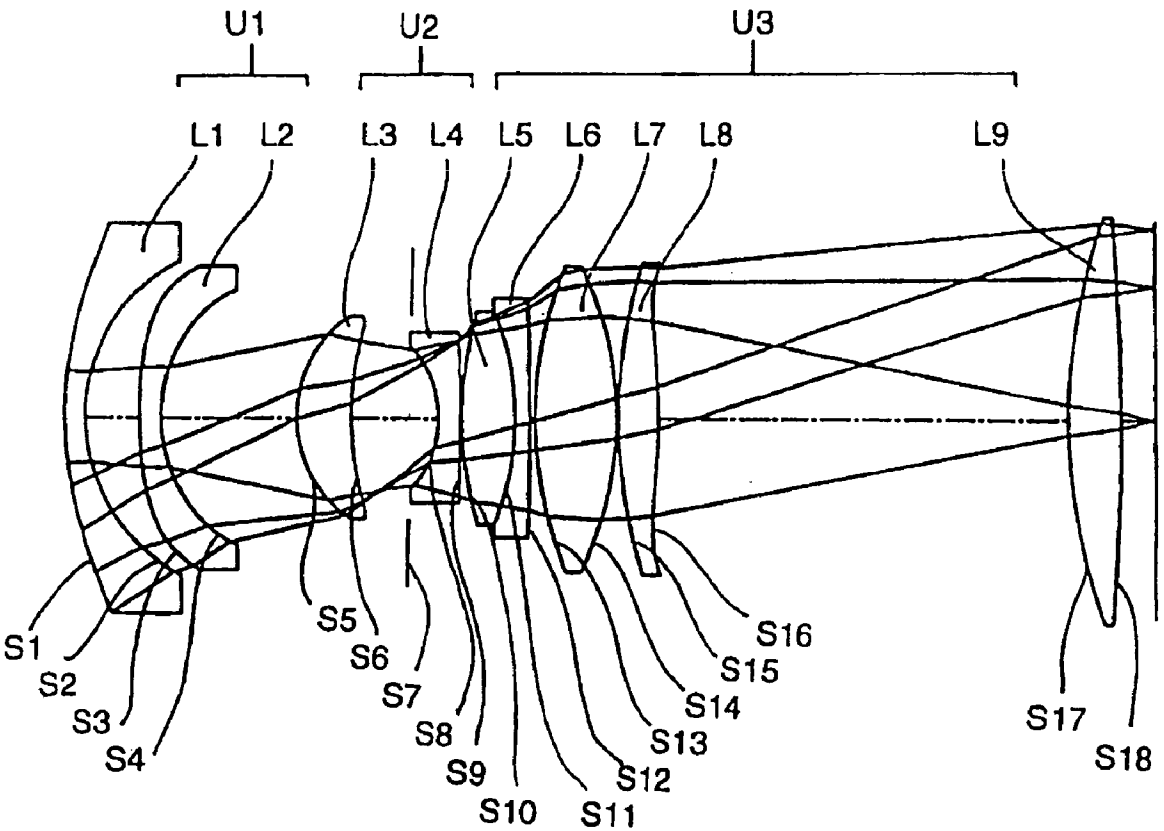
FIGS. 1 through 15 are schematic side views of lens systems constructed in accordance with the invention.
Figure 2:
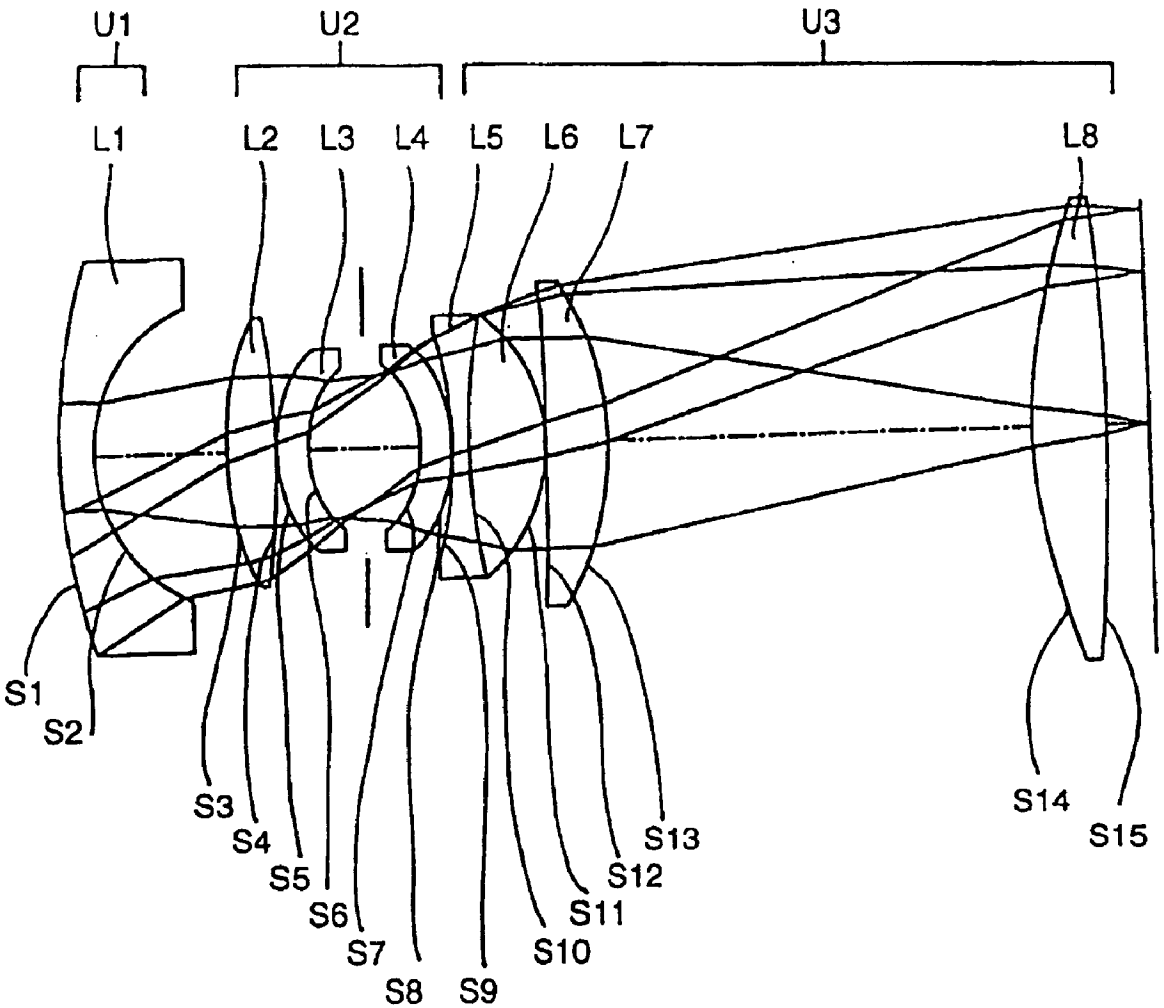
Figure 3:
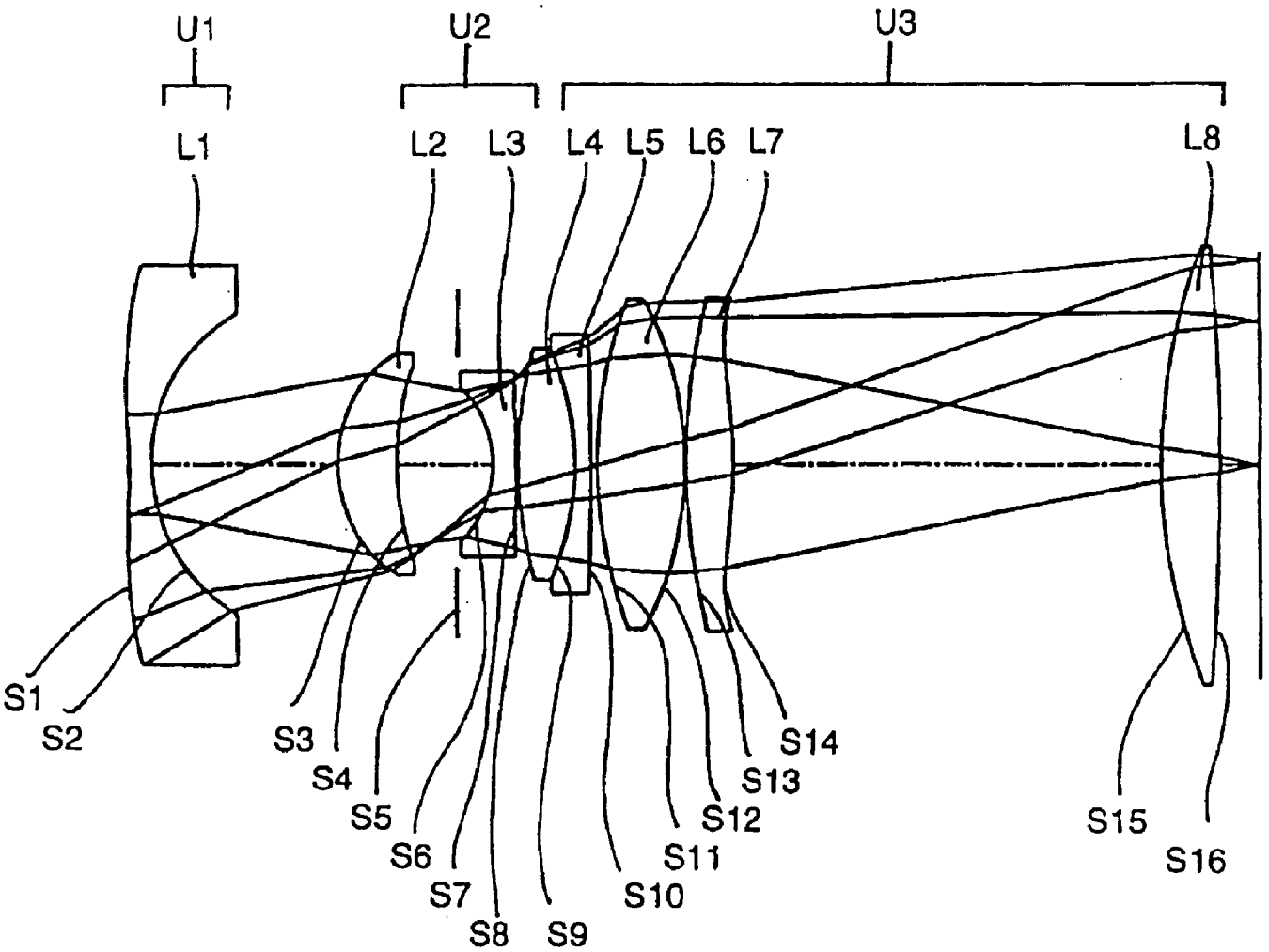
Figure 4:
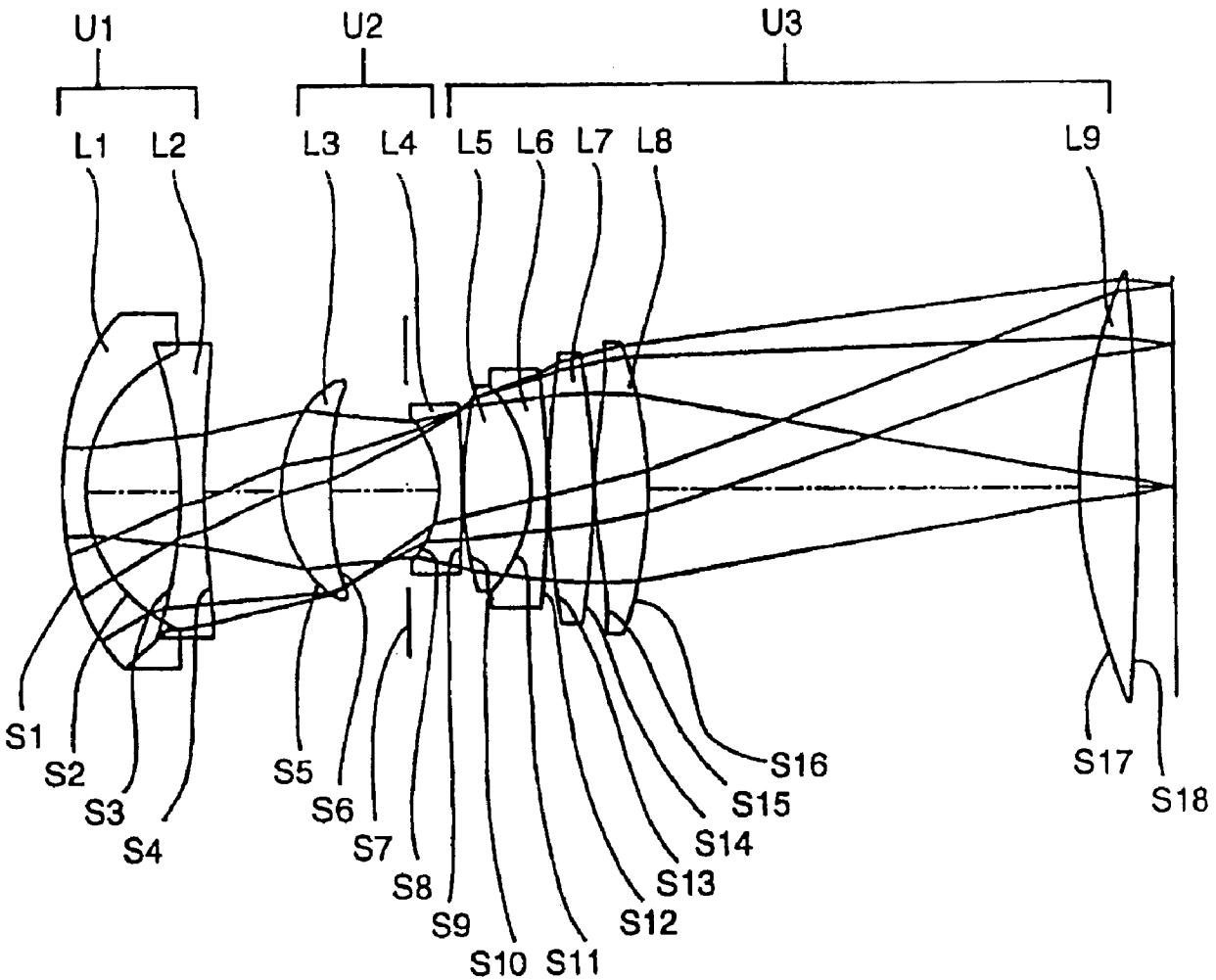
Figure 5:
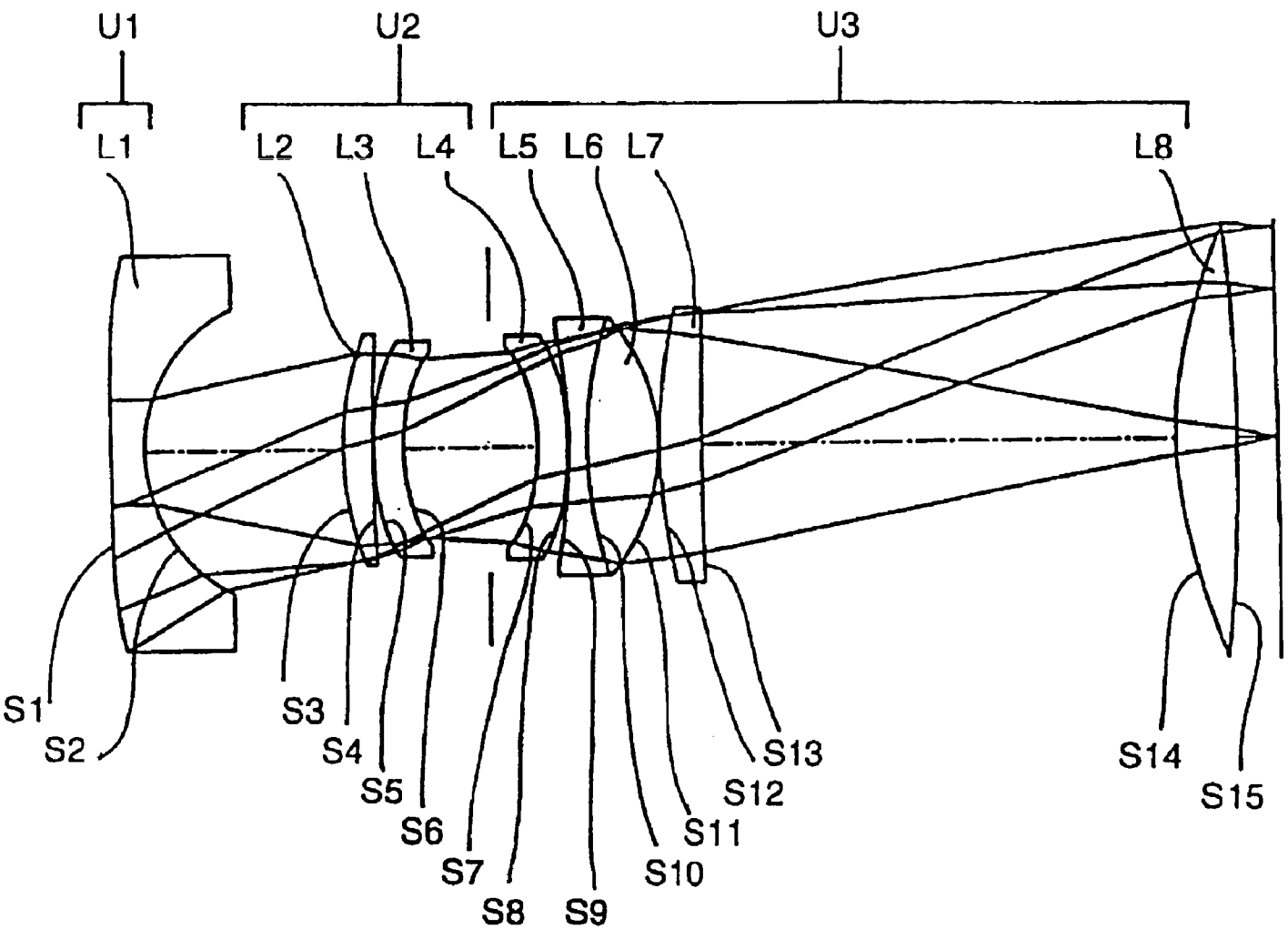
Figure 6:
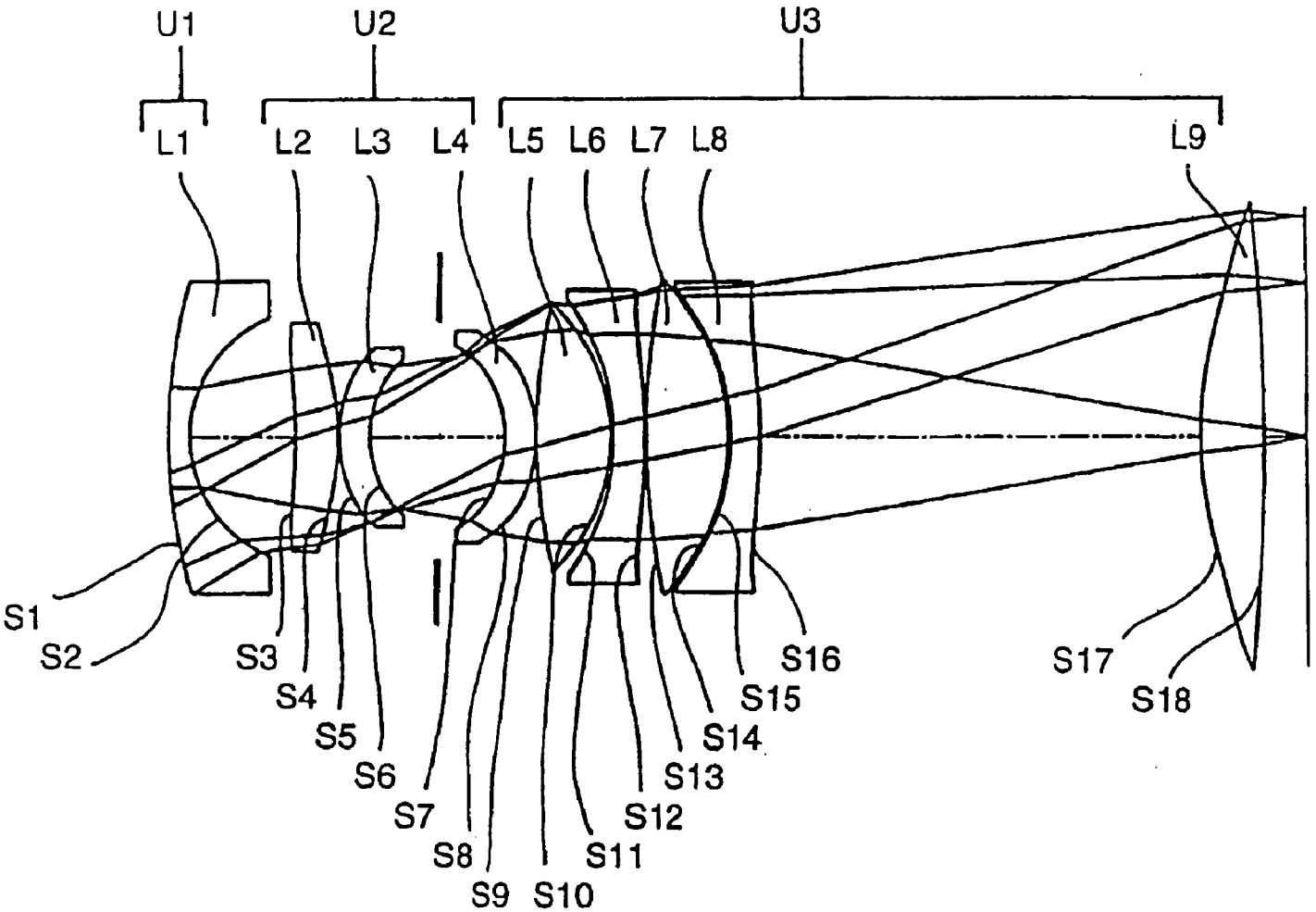
Figure 7:
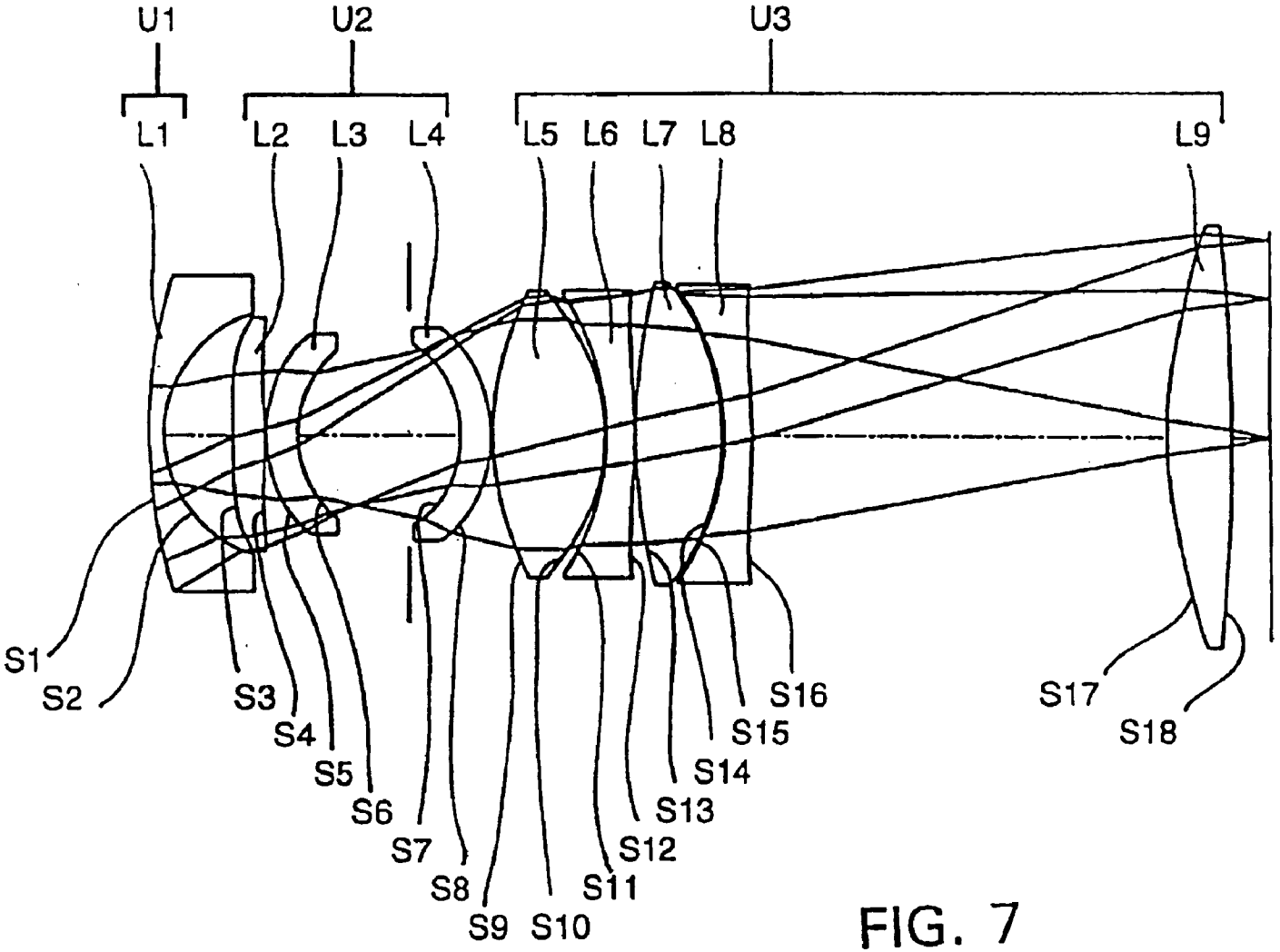
Figure 8:
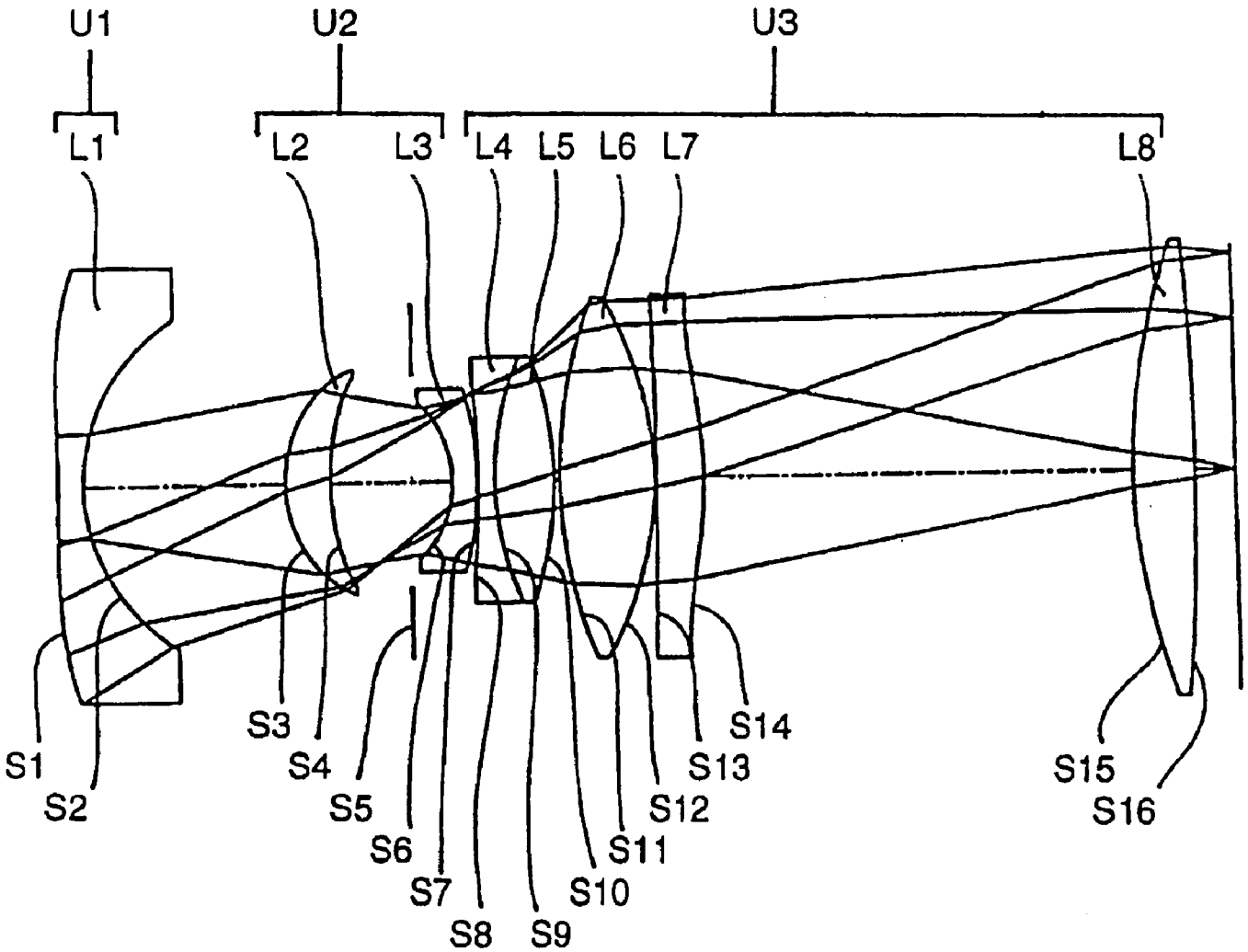
Figure 9:
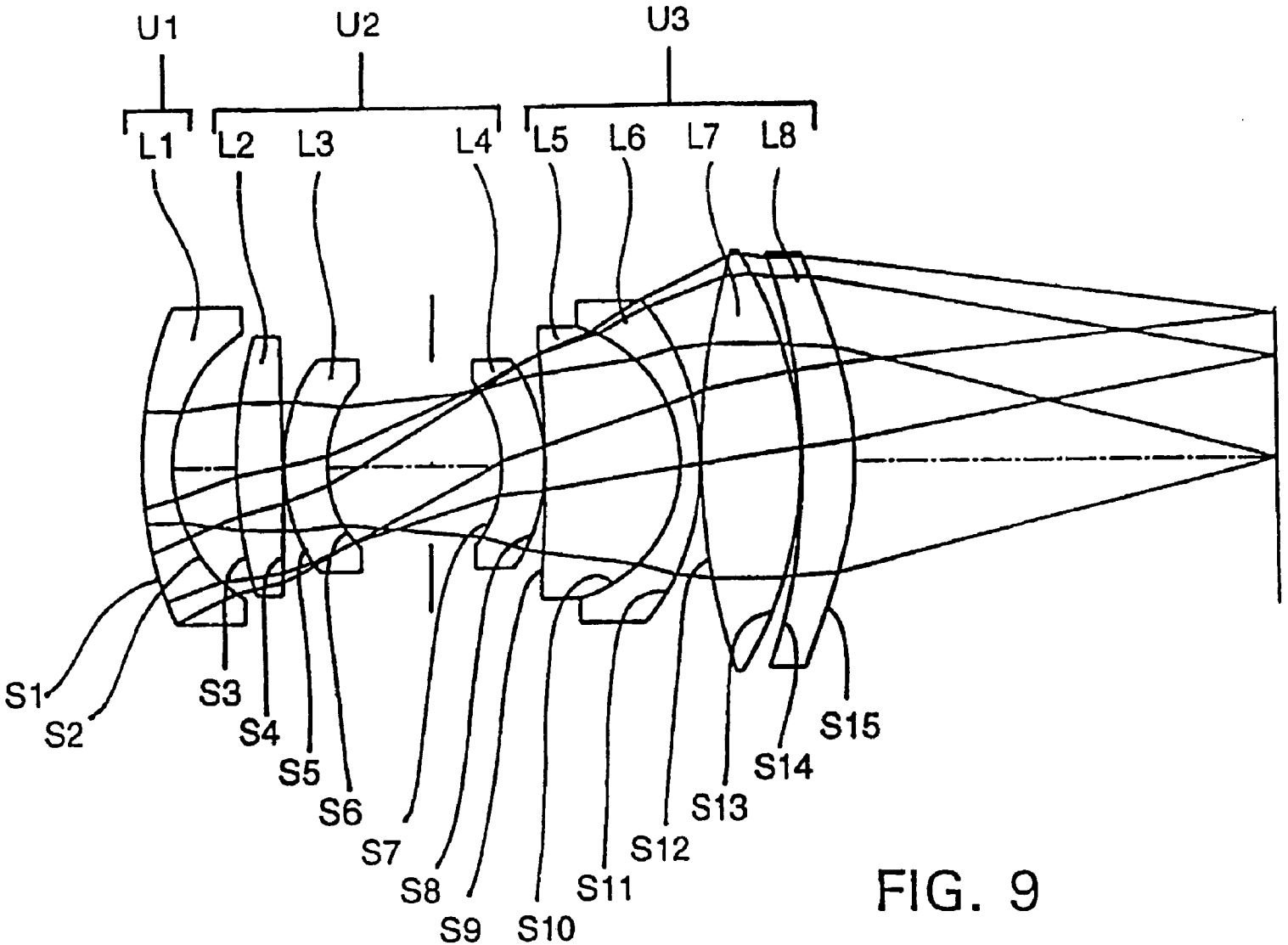
Figure 10:
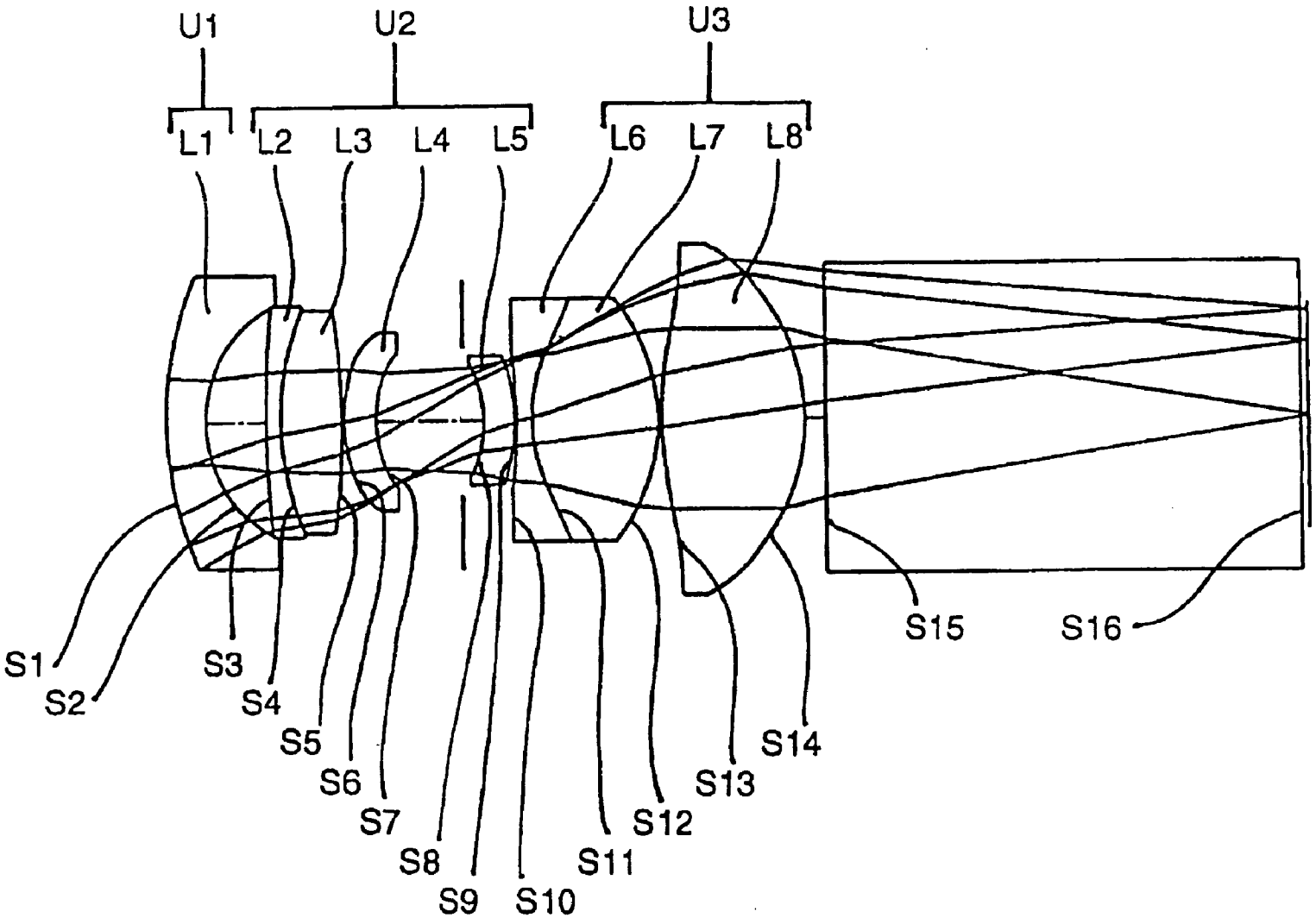

The first unit can contain a single negative element (FIGS. 2–3 and 5–15) or multiple negative elements (FIGS. 1 and 4). Where multiple negative elements are used, the elements can all be meniscus shaped (FIG. 1) or can be a combination of meniscus and biconcave elements (FIG. 4).

To minimize lateral color contributions, all the negative elements in the first unit are preferably made of a low dispersion material, i.e., a material having a dispersion like crown glass, such as acrylic in the case of a plastic lens element. As used herein, a low dispersion material is one having a V-value in the range from 35 to 75 for an index of refraction in the range from 1.85 to 1.5, while a high dispersion material is one having a V-value in the range from 20 to 50 for the same range of indices of refraction.

The first lens unit preferably includes one or more aspheric surfaces which provide a major contribution to the correction of the distortion of the system.

II. The Second Lens Unit

The second lens unit contains the system's aperture stop which is located between the two menisci of that unit. The stop can be a lens mount, a separate aperture, or a variable diaphragm depending upon the particular application.

The menisci elements of this unit make a significant contribution to the correction of the field curvature of the lens system. These elements preferably have aspheric surfaces in order to correct other aberrations in the system. Specifically, the aspheric surfaces serve to correct aperture dependent aberrations, e.g., spherical aberration, as well as coma and other residual aberrations. The correction of spherical aberration by these aspheric surfaces allows fore the achievement of smaller f-numbers for the lens system. By locating the stop between the facing menisci, the odd powered aberrations of these elements, i.e., coma, distortion, and lateral color, are automatically, minimized by the structure of the lens. See, for comparison, the Hypergon lens (U.S. Pat. No. 706,650) and the Topogon lens (U.S. Pat. No. 2,031,792). In this way, the aspheric surfaces of these elements can be used primarily to correct aberrations arising elsewhere in the system.

The second lens unit can include an additional lens element located on the long conjugate side of and directly associated with the first meniscus element, i.e., in contact with or essentially in contact with the first meniscus element (FIGS. 2, 5–7, and 9–15).

Figure 11:
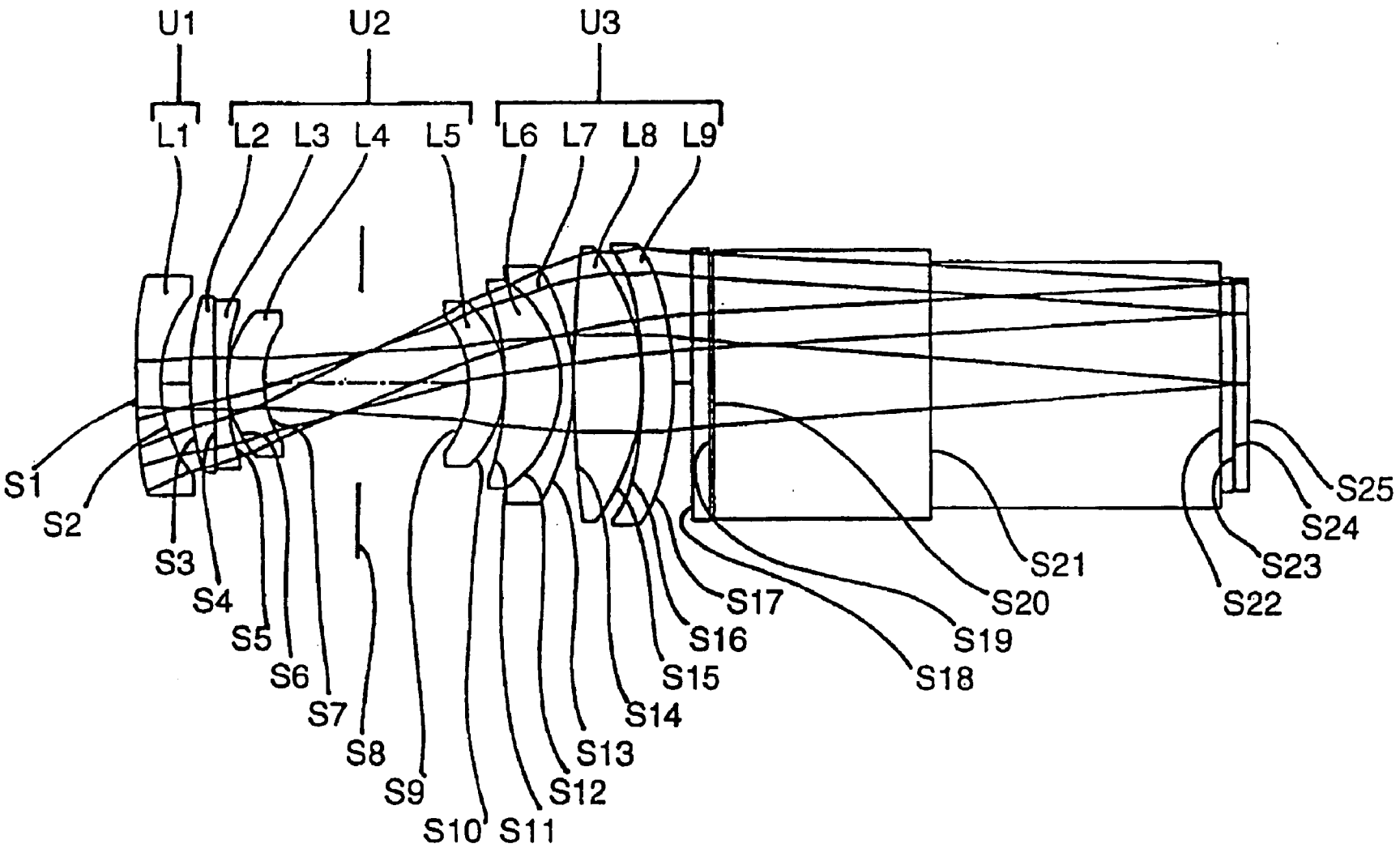

This additional element usually has a positive power to enhance the correction of distortion and astigmatism and is made of a high dispersion material (e.g., a flint glass or styrene) to achieve a better correction of lateral color. To improve this correction even further, the element may be made as a cemented doublet as shown in FIG. 11. The lateral color improvement achieved by this additional element occurs through, inter alia, its interaction with the low dispersion negative element(s) of the first lens unit. This combination of a low dispersion negative element and a high dispersion positive element functions in a manner similar to that of an afocal attachment of the type previously used with double Gauss and retrofocus lens systems. See, for example, Kawamura, U.S. Pat. No. 4,046,459, in which two low dispersion negative meniscus elements (elements 1 and 2) and a high dispersion positive element (element 3) are used to correct lateral color.

The additional lens element may also include an aspherical surface(s) to enhance the correction of monochromatic aberrations including distortion, especially, if no aspherical surfaces are used in the first lens unit.

Figure 12:
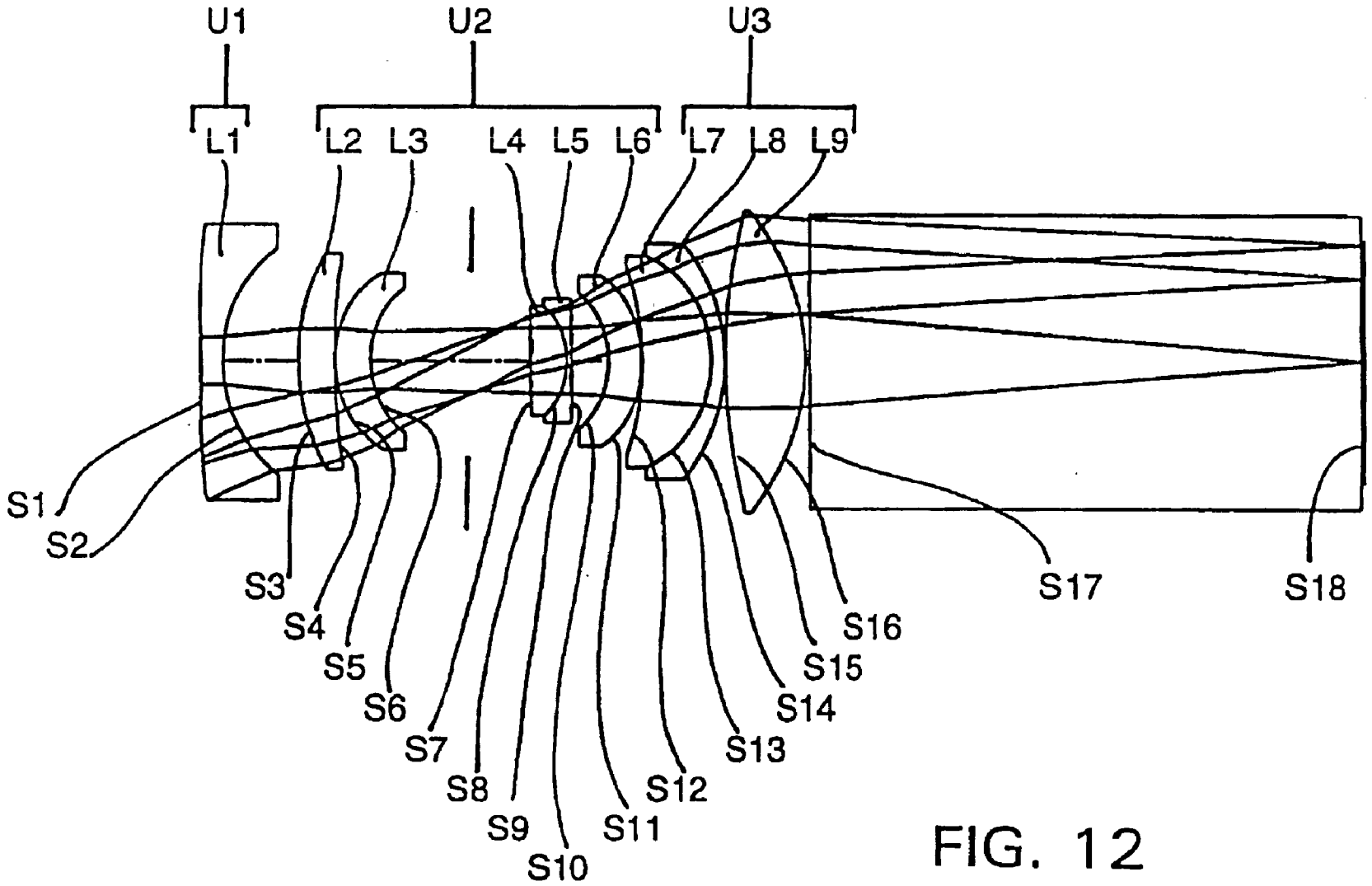
Figure 13:
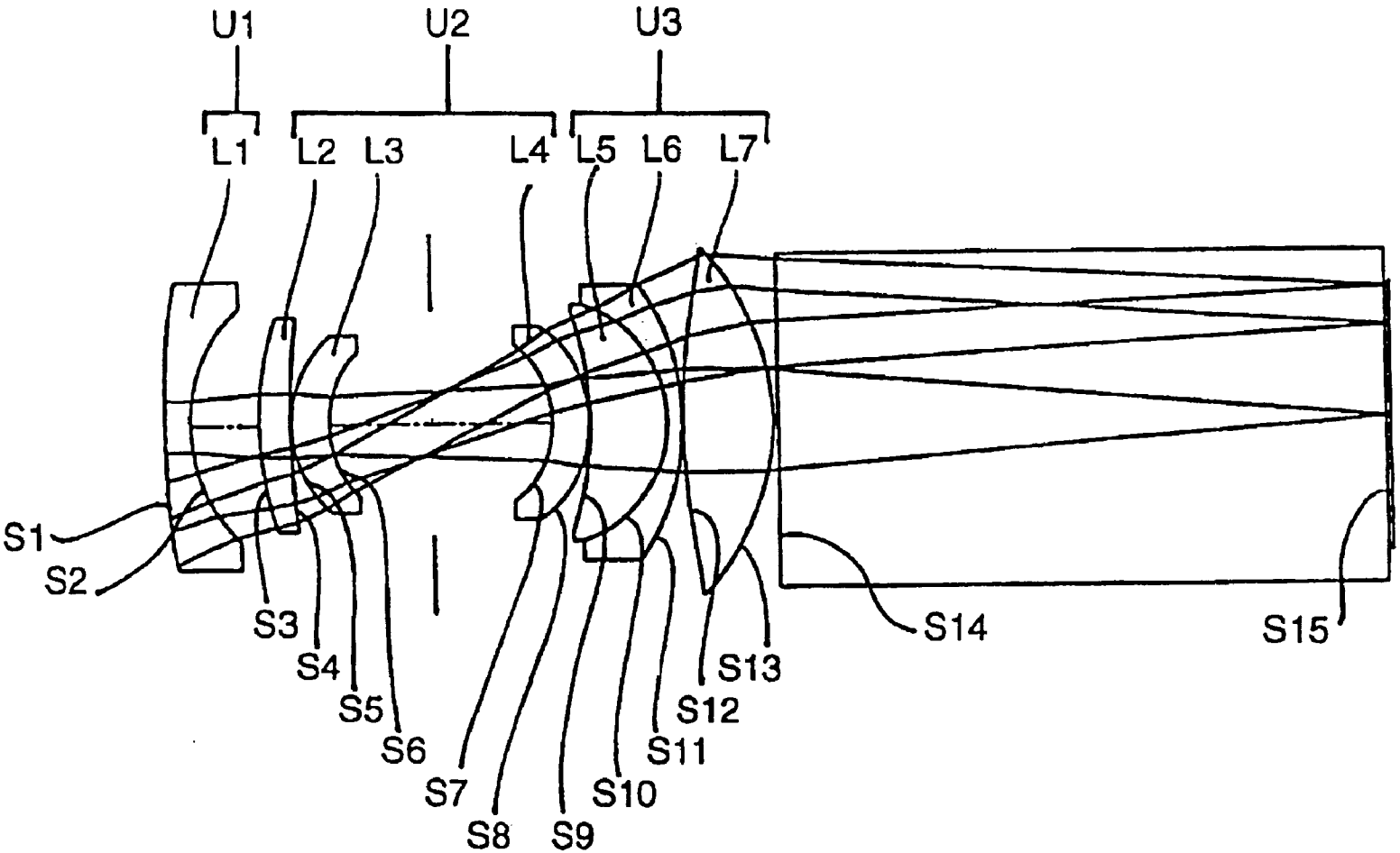
Figure 14:
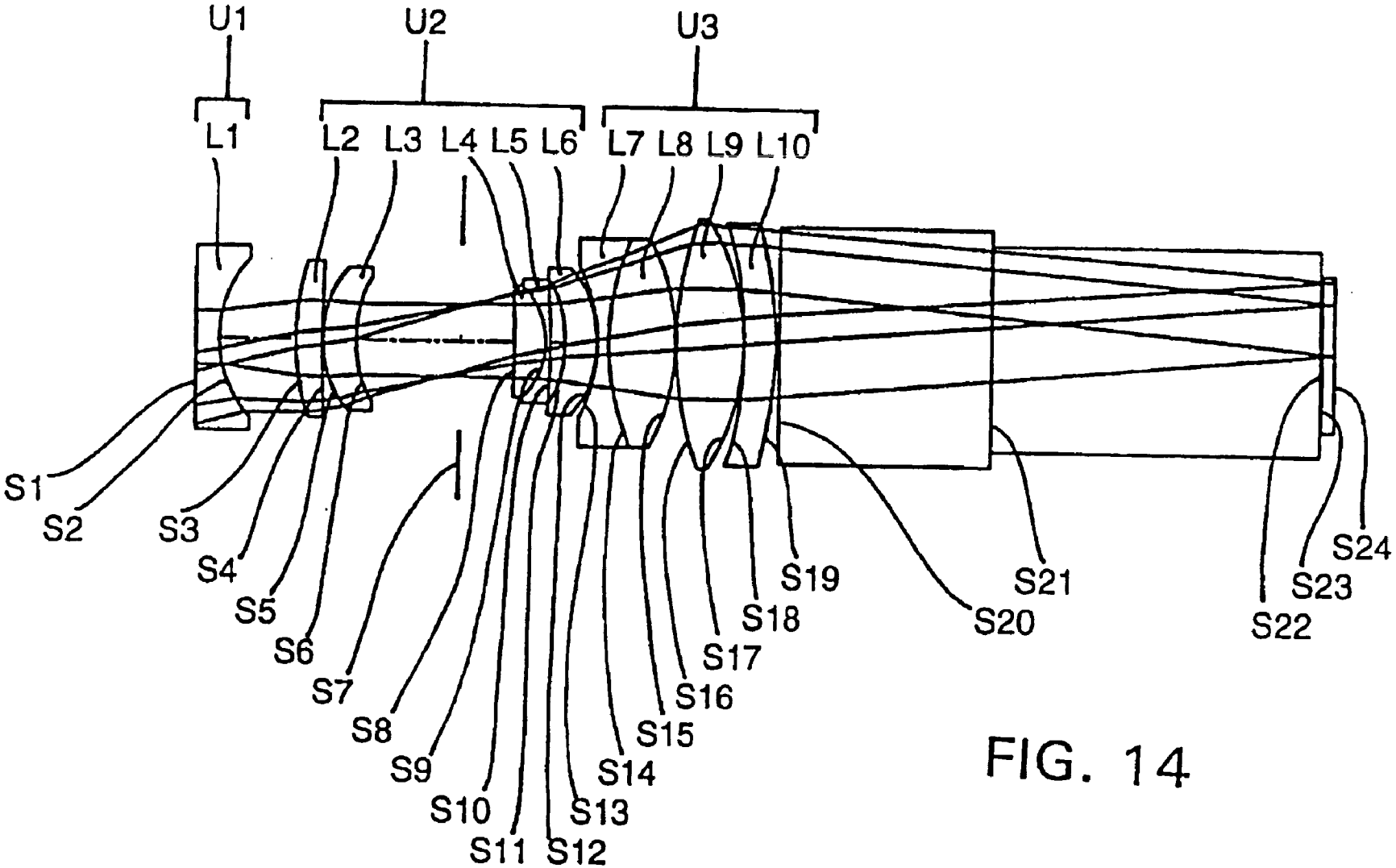
Figure 15:
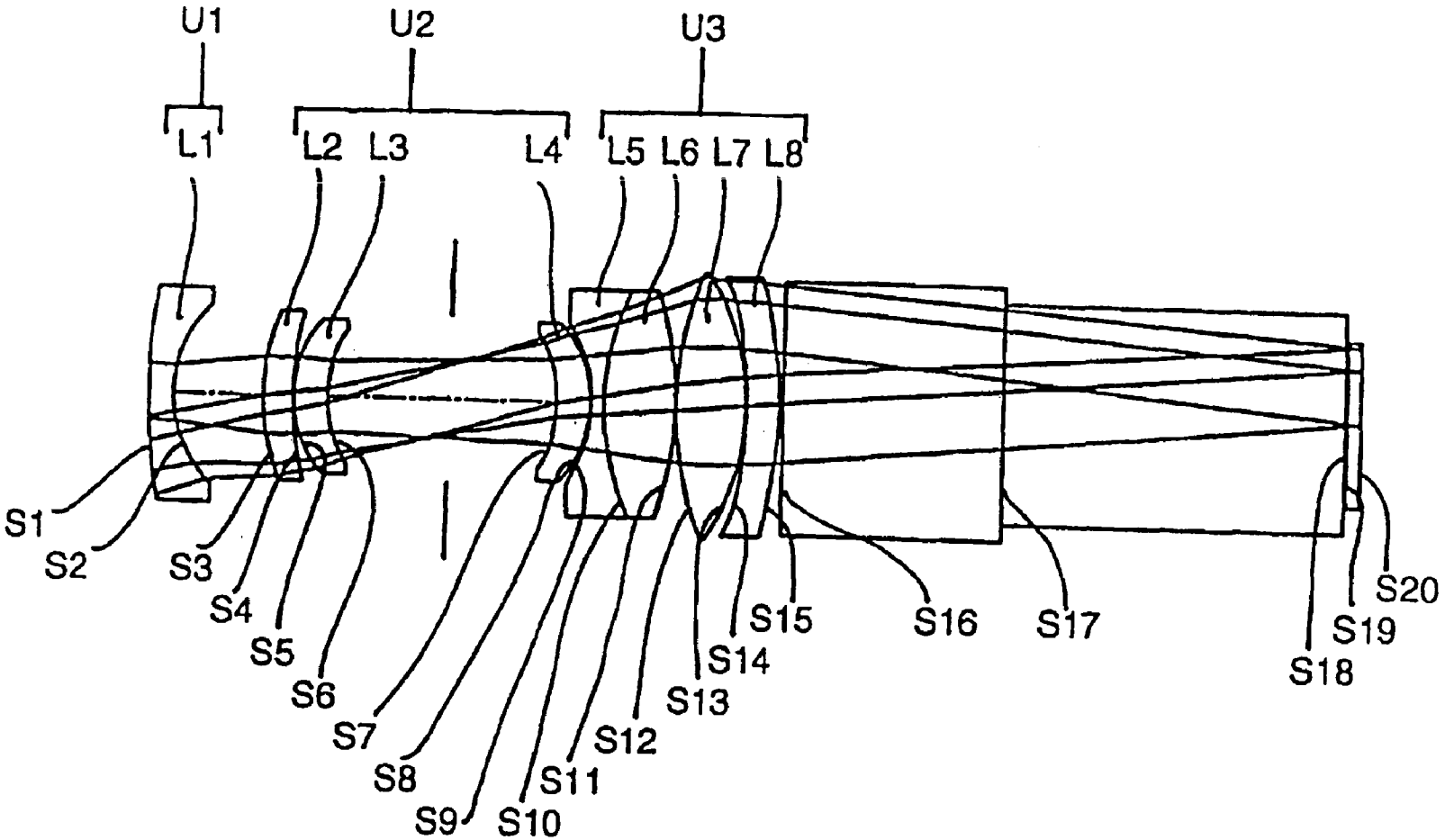

The second lens unit may have a color correcting doublet near the aperture stop of the lens to provide an enhanced correction of the axial color of the lens system (FIGS. 12 and 14). This additional correction may be required when the color correcting doublet in the third lens unit (see below) is designed to provide a particularly fine correction of the system's secondary lateral color and thus is not able to provide a sufficient correction of axial color. By placing the color correcting doublet of the second lens unit near the aperture stop, this doublet can correct axial color without significantly affecting the lateral color correction provided by the color correcting doublet of the third lens unit and the combination of the negative low dispersion lens element or elements of the first lens unit and the positive high dispersion additional lens element of the second lens unit. In certain embodiments, the color correcting doublet of the second lens unit can be composed of materials having abnormal partial dispersions (see Table 14).

III. The Third Lens Unit

The third lens unit has a positive optical power and preferably provides the majority of the positive power of the lens system. The aperture stop of the lens system is located at or near the front focal point of the third lens unit so that the entrance pupil of the lens system for light traveling from right to left in the figures is at a long distance from the lens system, i.e., so that the lens system is telecentric. As can be seen in the figures, a large space characterized by the system's ASOD is provided either within or just behind the third lens unit.

The third lens unit includes a color correcting means. The color correcting means can be a classical color correcting doublet employing a positive low dispersion (crown) element and a negative high dispersion (flint) element. However, as illustrated in Table 12, the color correcting means of the third lens unit can also include a positive and a negative element, each composed of a low dispersion (crown) material, with the material being different for the two elements and with at least one of the materials having an abnormal partial dispersion. The use of such a configuration arises as follows.

Primary lateral color describes the difference in size of the red and blue images formed by a given lens system. In some embodiments of the invention, see, for example FIGS. 11–13, where the lens has a long back focal distance, the off-axis bundles go through the third lens unit at significant heights, larger than the axial beam height. In this situation.. secondary lateral color, i.e., the difference in magnification of the red-blue image versus the green image, may become a problem of concern. When this is the case, secondary color can be corrected by the use of materials with abnormal partial dispersions in the color correcting means of the third lens unit (see Table 12). In the process of achieving correction of secondary lateral color, the correction of axial color may be compromised. In this case, an additional doublet in the second lens unit can be used (again see Table 12).

The lens elements of third lens unit will normally include one or more aspherical surfaces which provide correction of pupil spherical aberration as well as contribute to the correction of residuals of spherical aberration, distortion, astigmatism, and coma.

FIGS. 1 to 15 illustrate various lens systems constructed in accordance with the invention. Corresponding lens prescriptions appear in Tables 1 to 15, respectively. Lens units, lens elements, and lens surfaces are identified by "U", "L", and "S" numbers, respectively, in the figures.

As is conventional, the figures are drawn with the long conjugate on the left and the short conjugate on the right. Accordingly, in the typical application of the invention, e.g., in a computer monitor, the viewing screen will be on the left and the pixeled panel or panels will be on the right.

In FIGS. 10–15, the various surfaces appearing after the third lens unit correspond to optical elements, such as mirrors, prisms, and the like, used in forming a color image from pixeled panels. Although not shown in FIGS. 1–9, similar optical elements can be used with the lens systems of these figures. In FIGS. 1–8, a folding mirror (not shown) can be included between the two rear elements of the lens system to reduce the overall size of a projection TV/computer monitor employing the lens system.

The glasses and plastics referred to in Tables 1–15 are set forth in Table 16, where the glass names are the SCHOTT designations. Equivalent materials made by other manufacturers can be used in the practice of the invention.

The aspheric coefficients set forth in the tables are for use in the following equation:

$$z = \frac{cy^2}{1+[1-(1+k)c^2y^2]^{1/2}} + ADy^4 + AEy^6 + AFy^8 + AGy^{10} + AHy^{12} + AIy^{14}$$

where z is the surface sag at a distance y from the optical axis of the system, c is the curvature of the lens at the optical axis, and k is a conic constant, which is zero for all of the examples.

The abbreviations used in the Tables 1–15 are as follows: SN—surface number; CLR, AP.—clear aperture; EFL—effective focal length of the system; FVD—front vertex distance; f/—f-number; IMD—image distance; OBD—object distance; OVL—overall length; OBJ. HT—object height; MAG—magnification; ENP—entrance pupil; EXP—exit pupil; and BRL—barrel length, where the values given are for light traveling from left to right in the figures. The designation "a" associated with various surfaces represents "aspheric". All dimensions given in the Tables 1–15 and 17 are in millimeters.

Table 17 summarizes various of the properties and advantages of the present lens system. The abbreviations used in this table are as follows: Field—half field of view for light traveling from left to right; F/No—f-number; f—effective focal length of the system; $f_1$, $f_2$, and $f_3$—focal lengths of units 1, 2, and 3, respectively; ASOD—aperture stop to object distance for light traveling from right to left; and ENPD—entrance pupil distance for light traveling from right to left.

As shown in Table 17, for all of the examples, the first lens unit has a negative power, the second lens unit is of weak optical power, and the third lens unit is the strongest contributor to the lens system's overall positive power. The table further shows that except for Examples 5, 12, and 14–15, the third lens unit provides the majority of the positive power of the system, where "majority" means that the positive power of the third lens unit is more than twice the positive power of the second lens unit for those second lens units that have a positive power.

As also shown in Table 17, all of the lens systems have a large ASOD, a telecentric entrance pupil, and, except for Example 14 and 15, a wide field of view, i.e., a field of view of 25° or higher. Examples 14 and 15 are designed for use with multiple folding mirrors between the lens system and the viewing screen which allows for a somewhat smaller field of view. Because the field of view is smaller, the viewing screen need not have as large a numerical aperture, which allows for a simpler screen construction. Also, the smaller field of view means that the illumination at the corners of the screen is higher since the $\cos^4$ dropoff is less.

Table 17 further shows that all of the lens systems of the invention have ASOD/f values that are greater than 2.5 and all but Example 2 have values greater than the preferred value of 3.0, with the value for Example 2 being about 3.0.

Figure 16:
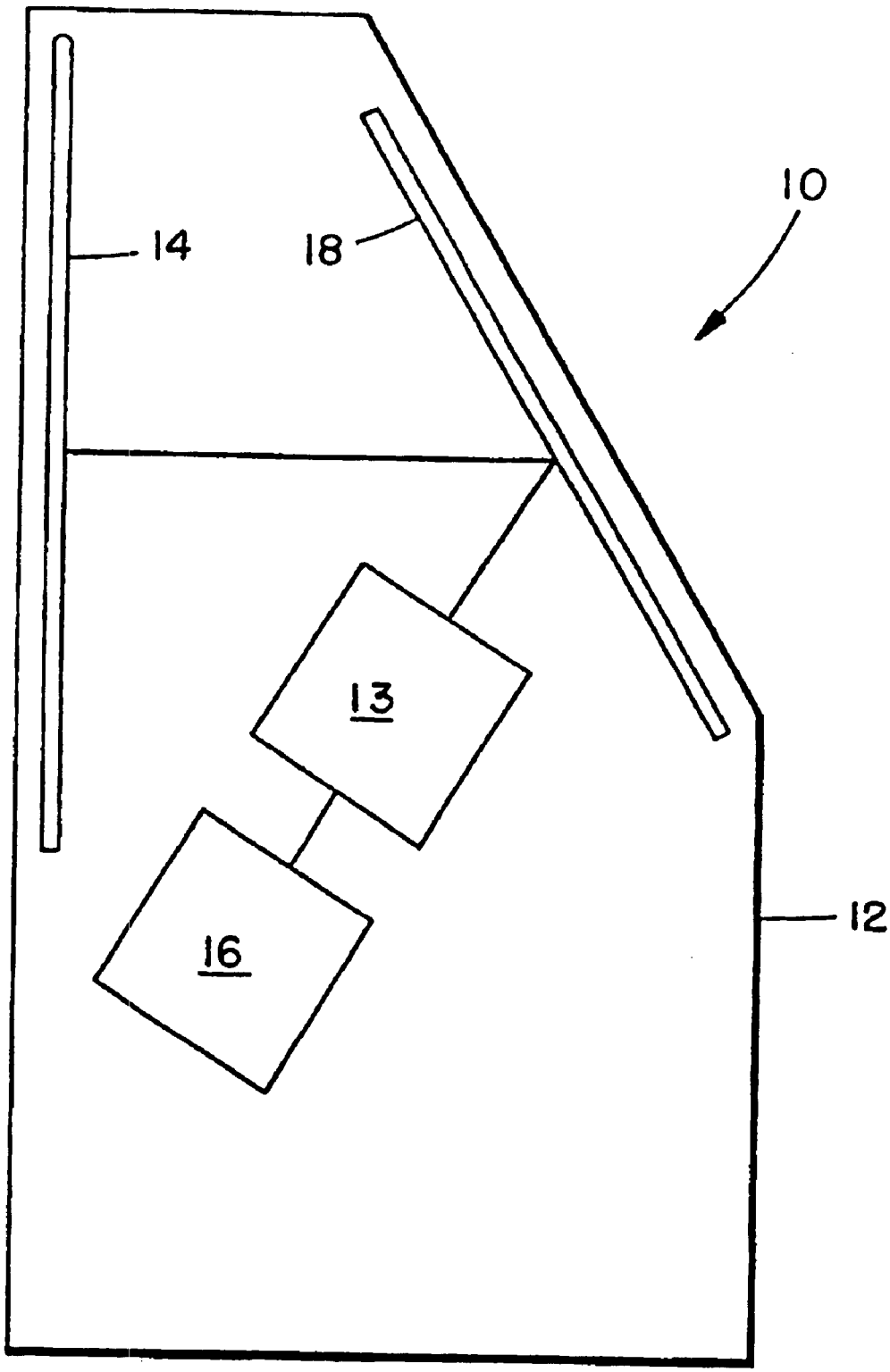
FIG. 16 is a schematic diagram of a projection TV/computer monitor employing a lens system constructed in accordance with the invention.

FIG. 16 is a schematic diagram of a projection television/computer monitor 10 constructed in accordance with the invention. As shown in this figure, projection television/computer monitor 10 includes cabinet 12 having projection screen 14 along its front face. The image to be projected is formed by module 16 which includes, inter alia, a light source, three pixelized panels, and a set of dichroic beam-splitters for combining the light from the three panels into a single beam. Alternatively, module 16 can include a single, three color, pixelized panel and its associated optical components. Various commercially available components known in the art can be used to construct module 16.

The single, three-color beam produced by module 16 is projected by lens system 13 onto mirror 18 and ultimately to screen 14. Lens system 13 is constructed in accordance with the present invention and thus forms a high quality image on the screen. In particular, the distortion is fully corrected, the monochromatic imagery is flat and uniformly bright across the format, and the lateral color across the entire active surface of the pixelized panel or panels over the visual light spectrum is less than about the diagonal of a pixel and preferably less than about ½ the diagonal of a pixel.

Although specific embodiments of the invention have been described and illustrated, it is to be understood that a variety of modifications which do not depart from the scope and spirit of the invention will be evident to persons of ordinary skill in the art from the foregoing disclosure. The following claims are intended to cover the specific embodiments set forth herein as well as such modifications, variations, and equivalents.

TABLE 1

| SN. | RADIUS | THICKNESS | GLASS | CLR. AP. |
|---|---|---|---|---|
| 1 | 100.8190 | 6.00000 | ACRYLIC | 107.63 |
| 2 | 48.9744 | 15.25518 | | 84.97 |
| 3a | 143.9044 | 6.00000 | ACRYLIC | 81.86 |
| 4a | 43.3618 | 37.93520 | | 68.93 |
| 5a | 35.6345 | 15.00000 | STYRENE | 54.27 |
| 6a | 81.6110 | 17.36272 | | 47.86 |
| 7 | Aperature stop | 7.77990 | | 37.45 |
| 8a | −27.2425 | 6.00000 | STYRENE | 37.38 |
| 9a | −423.3710 | 0.50000 | | 45.18 |
| 10 | 107.7346 | 15.00000 | SK5 | 52.75 |
| 11 | −73.4827 | 4.00000 | SP6 | 57.31 |
| 12 | −1002.5660 | 1.50000 | | 64.58 |
| 13 | 108.4138 | 23.00000 | SK5 | 80.44 |
| 14 | −95.4279 | 0.50000 | | 82.81 |
| 15a | 133.2972 | 12.00000 | ACRYLIC | 84.41 |
| 16a | −132.2276 | 114.48260 | | 83.83 |
| 17a | 139.3172 | 15.00000 | ACRYLIC | 108.80 |
| 18a | −700.0000 | 10.00020 | | 108.50 |

TABLE 1-continued

EVEN POLYNOMIAL ASPHERES

| SN. | AD | AE | AF | AG | AH | AI |
|---|---|---|---|---|---|---|
| 1 | −1.5934E-07 | −3.2301E-11 | −8.4041E-15 | −1.4417E-18 | 1.0816E-22 | 2.0851E-25 |
| 3 | 2.0545E-06 | −1.5307E-10 | 1.8192E-13 | 7.9530E-17 | 2.8673E-20 | 1.1986E-23 |
| 4 | −9.7451E-08 | 4.9263E-10 | −4.9311E-13 | 2.6150E-16 | 3.9054E-19 | 1.2880E-22 |
| 5 | −2.3574E-07 | −1.3342E-09 | 5.3174E-12 | −7.7048E-17 | −1.1073E-17 | 1.2716E-20 |
| 6 | −8.2802E-07 | 1.6251E-09 | 1.1805E-12 | −2.0627E-14 | 5.0501E-17 | −3.3873E-20 |
| 8 | 4.4580E-07 | −4.4341E-09 | 1.5629E-11 | 9.3004E-15 | −1.6550E-16 | 2.5239E-19 |
| 9 | 8.5180E-07 | −1.8891E-10 | 1.2699E-12 | 5.1184E-16 | −2.8733E-18 | 3.3000E-21 |
| 15 | −1.6675E-07 | 8.4927E-11 | 3.6771E-14 | 2.5463E-17 | −5.0093E-21 | −1.1761E-23 |
| 16 | 1.7020E-06 | 2.7211E-10 | 3.2080E-14 | 3.7396E-17 | −1.0735E-20 | −7.5127E-24 |
| 17 | −1.8602E-07 | 5.2861E-11 | −2.2361E-14 | 5.1543E-18 | −1.9417E-21 | 4.4279E-25 |

SYSTEM FIRST ORDER PROPERTIES

| | | |
|---|---|---|
| OBJ. HT: −660.40 | fl: 2.40 | MAG: −0.0800 |
| EFL: 65.6056 | FVD: 307.316 | ENP: 57.7119 |
| IMD: 10.0002 | BRL: 297.316 | EXP: −13189.8 |
| OBD: −762.684 | OVL: 1070.00 | |
| STOP: 0.00 after surface 7. DIA: 37.446 | | |

TABLE 2

| SN. | RADIUS | THICKNESS | GLASS | CLR. AP. |
|---|---|---|---|---|
| 1 | 158.7994 | 8.37562 | BK7 | 95.61 |
| 2 | 38.8752 | 32.61261 | | 69.13 |
| 3a | 94.7110 | 12.00000 | STYRENE | 63.03 |
| 4 | −203.5070 | 0.27919 | | 61.22 |
| 5a | 42.9601 | 7.44470 | ACRYLIC | 46.52 |
| 6a | 29.5212 | 27.52002 | | 36.41 |
| 7a | −29.5212 | 7.44470 | ACRYLIC | 38.06 |
| 8a | −42.9601 | 0.27919 | | 47.24 |
| 9 | −95.0201 | 4.18781 | SF14 | 52.65 |
| 10 | 153.0600 | 18.61174 | SK5 | 63.41 |
| 11 | −40.9609 | 0.27919 | | 63.59 |
| 12a | −1496.9570 | 15.00000 | ACRYLIC | 73.63 |
| 13 | −76.4720 | 105.36350 | | 76.70 |
| 14a | 104.2866 | 18.00000 | ACRYLIC | 107.94 |
| 15 | −535.3889 | 9.99825 | | 107.71 |

EVEN POLYNOMIAL ASPHERES

| SN. | AD | AE | AF | AG | AH | AI |
|---|---|---|---|---|---|---|
| 3 | 1.2971E-06 | −1.9595E-10 | 9.6038E-14 | 5.3556E-17 | −9.0228E-20 | 1.3068E-22 |
| 5 | 1.8328E-06 | −4.7943E-10 | 1.1410E-11 | −1.3831E-14 | 2.0351E-17 | −1.7888E-21 |
| 6 | 2.7335E-06 | 1.3736E-08 | −3.3516E-11 | 1.0660E-13 | −8.6134E-17 | 2.6188E-19 |
| 7 | −2.7335E-06 | −1.3736E-08 | 3.3516E-11 | −1.0660E-13 | 8.6134E-17 | −2.6188E-19 |
| 8 | −1.8328E-06 | 4.7913E-10 | −1.1410E-11 | 1.3831E-14 | −2.0351E-17 | 1.7888E-21 |
| 12 | −1.7503E-08 | −5.9870E-10 | 5.5361E-13 | −1.0091E-16 | −2.0521E-19 | 9.6568E-23 |
| 14 | −6.5592E-07 | −3.0849E-10 | 3.2824E-13 | −1.1758E-16 | 1.9238E-20 | −1.1976E-24 |

SYSTEM FIRST ORDER PROPERTIES

| | | |
|---|---|---|
| OBJ. HT: −660.40 | fl: 2.40 | MAG: −0.0800 |
| EFL: 65.9995 | FVD: 267.397 | ENP: 47.5474 |
| IMD: 9.99825 | BRL: 257.398 | EXP: 933.924 |
| OBD: −772.750 | OVL: 1040.15 | |
| STOP: 13.76 after surface 6. DIA: 34.222 | | |

TABLE 3

| SN. | RADIUS | THICKNESS | GLASS | CLR. AP. |
|---|---|---|---|---|
| 1a | −569.1859 | 6.00000 | ACRYLIC | 103.24 |
| 2a | 43.4332 | 49.25188 | | 75.58 |
| 3a | 35.5386 | 15.00000 | STYRENE | 54.67 |
| 4a | 76.6546 | 17.03723 | | 47.98 |
| 5 | Aperature stop | 8.21508 | | 37.52 |
| 6a | −26.8487 | 6.00000 | STYRENE | 37.44 |
| 7a | −416.2517 | 0.50000 | | 45.39 |
| 8 | 109.7018 | 15.00000 | SK5 | 52.67 |
| 9 | −72.4406 | 4.00000 | SF6 | 57.25 |
| 10 | −797.2393 | 1.50000 | | 64.51 |
| 11 | 109.2625 | 23.00000 | SK5 | 80.23 |
| 12 | −91.7278 | 0.50000 | | 82.51 |
| 13a | 161.3874 | 12.00000 | ACRYLIC | 83.64 |
| 14a | −124.5568 | 112.67720 | | 83.29 |
| 15a | 139.8700 | 15.00000 | ACRYLIC | 108.92 |
| 16 | −700.0000 | 9.99310 | | 108.53 |

EVEN POLYNOMIAL ASPHERES

| SN. | AD | AE | AF | AG | AH | AI |
|---|---|---|---|---|---|---|
| 1 | 1.5269E-06 | −4.7793E-10 | 8.6329E-14 | 1.7534E-17 | −1.0696E-20 | 1.3478E-24 |
| 2 | −5.8872E-07 | 6.2672E-10 | −7.1632E-13 | 8.0158E-17 | 2.6776E-19 | −1.1388E-22 |
| 3 | −3.5984E-07 | −1.2303E-09 | 5.4687E-12 | −1.4090E-16 | −1.1096E-17 | 1.2154E-20 |
| 4 | −9.0496E-07 | 2.1367E-09 | 1.1451E-12 | −2.0602E-14 | 5.0957E-17 | −3.5173E-20 |
| 6 | 5.7611E-07 | −3.9036E-09 | 1.9304E-11 | 8.2042E-15 | −1.7730E-16 | 2.7062E-19 |
| 7 | 9.8174E-07 | 1.2856E-10 | 1.0683E-12 | 9.5925E-17 | −2.9673E-18 | 3.7727E-21 |
| 13 | −1.6458E-07 | 4.8211E-11 | 2.4178E-14 | 2.1575E-17 | −5.9263E-21 | −1.0409E-23 |
| 14 | 1.6358E-06 | 2.6911E-10 | 1.6924E-14 | 3.2156E-17 | −9.6676E-21 | −6.4011E-24 |
| 15 | −1.4088E-07 | 5.6379E-11 | −3.6038E-14 | 6.7003E-18 | −3.6489E-22 | 7.2340E-26 |

SYSTEM FIRST ORDER PROPERTIES

| | | |
|---|---|---|
| OBJ. HT: −660.40 | fl: 2.40 | MAG: −0.0800 |
| EFL: 65.6496 | FVD: 295.674 | ENP: 46.6887 |
| IMD: 9.99310 | BRL: 285.681 | EXP: −11068.7 |
| OBD: −774.320 | OVL: 1069.99 | |
| STOP: 0.00 after surface 5. DIA: 37.505 | | |

TABLE 4

| SN. | RADIUS | THICKNESS | GLASS | CLR. AP. |
|---|---|---|---|---|
| 1a | 121.6711 | 6.00000 | ACRYLIC | 93.20 |
| 2a | 41.1280 | 25.00000 | | 71.09 |
| 3a | −107.0244 | 6.00000 | ACRYLIC | 75.16 |
| 4a | 175.4115 | 20.79812 | | 69.61 |
| 5a | 37.5326 | 13.00000 | STYRENE | 55.66 |
| 6a | 161.2136 | 21.18080 | | 52.12 |
| 7 | Aperature stop | 7.23365 | | 36.91 |
| 8a | −26.6420 | 6.00000 | STYRENE | 36.71 |
| 9a | −445.8134 | 0.50000 | | 43.12 |
| 10 | 104.5622 | 18.00000 | SK5 | 48.92 |
| 11 | −39.4092 | 4.00000 | F2 | 52.24 |
| 12 | −281.2199 | 0.50000 | | 60.79 |
| 13 | 200.0000 | 12.00000 | SK5 | 66.16 |
| 14 | −200.0000 | 0.50000 | | 69.13 |
| 15a | 97.9319 | 14.00000 | ACRYLIC | 72.62 |
| 16a | −98.6747 | 114.44620 | | 74.52 |
| 17a | 122.0959 | 15.00000 | ACRYLIC | 108.21 |
| 18a | −700.0000 | 9.99830 | | 108.04 |

TABLE 4-continued

EVEN POLYNOMIAL ASPHERES

| SN. | AD | AE | AF | AG | AH | AI |
|---|---|---|---|---|---|---|
| 1 | 1.5671E-06 | −2.9628E-10 | 6.2129E-14 | 4.5410E-18 | −2.5318E-21 | 3.2733E-24 |
| 2 | 4.4999E-07 | 1.2576E-09 | −9.5383E-13 | 6.7316E-17 | 2.6653E-19 | −3.2088E-23 |
| 3 | 2.0585E-07 | −5.1256E-12 | 3.8085E-14 | 1.4747E-17 | −6.1487E-21 | −1.0810E-23 |
| 4 | −1.1286E-06 | −8.3704E-11 | 1.5965E-13 | 1.2992E-16 | 1.7118E-19 | −1.4586E-22 |
| 5 | 1.9928E-07 | −1.0572E-09 | 2.5608E-12 | 4.2407E-15 | −1.1849E-17 | 9.8733E-21 |
| 6 | 1.9348E-06 | −4.9766E-11 | 6.1775E-12 | −2.3604E-14 | 3.7314E-17 | −1.9697E-20 |
| 8 | 4.2889E-06 | −2.9900E-09 | 1.7106E-11 | 3.0536E-14 | −2.1140E-16 | 2.7849E-19 |
| 9 | −3.6942E-07 | −9.6501E-10 | 2.5605E-12 | 4.5202E-16 | −3.0357E-18 | 8.6693E-22 |
| 15 | −1.9405E-06 | −1.6176E-10 | −2.2276E-13 | −1.5551E-17 | 6.7875E-20 | −1.7330E-24 |
| 16 | 1.2198E-06 | −6.4493E-10 | −8.4860E-14 | 1.4249E-17 | 9.7658E-21 | 1.9331E-23 |
| 17 | −9.2257E-08 | −2.8442E-11 | −8.2153E-15 | 6.3747E-18 | −3.6829E-21 | 8.0873E-25 |

SYSTEM FIRST ORDER PROPERTIES

| | | |
|---|---|---|
| OBJ. HT: −660.40 | fl: 2.60 | MAG: −0.0800 |
| EFL: 66.1922 | FVD: 294.157 | ENP: 52.2689 |
| IMD: 9.99830 | BRL: 284.159 | EXP: −6205.57 |
| OBD: −775.838 | OVL: 1070.00 | |
| STOP: 0.00 after surface 7. DIA: 36.239 | | |

TABLE 5

| SN. | RADIUS | THICKNESS | GLASS | CLR. AP. |
|---|---|---|---|---|
| 1a | −947.4765 | 8.37562 | ACRYLIC | 98.83 |
| 2 | 38.9498 | 50.59302 | | 68.59 |
| 3 | 76.9362 | 7.44470 | SF11 | 55.16 |
| 4 | 457.8991 | 0.27919 | | 53.94 |
| 5a | 78.8922 | 7.44470 | ACRYLIC | 51.42 |
| 6a | 57.2344 | 33.15717 | | 46.21 |
| 7a | −57.2344 | 7.44470 | ACRYLIC | 47.74 |
| 8a | −78.8922 | 0.27919 | | 53.35 |
| 9 | −143.5735 | 4.18781 | SF14 | 54.86 |
| 10 | 94.6729 | 18.61174 | SK5 | 60.30 |
| 11 | −47.1576 | 0.27919 | | 61.67 |
| 12a | 127.8837 | 11.16705 | ACRYLIC | 64.71 |
| 13 | 1321.2629 | 120.66400 | | 66.02 |
| 14a | 91.6236 | 15.00000 | ACRYLIC | 108.26 |
| 15 | −533.3889 | 9.97716 | | 108.26 |

EVEN POLYNOMIAL ASPHERES

| SN. | AD | AE | AF | AG | AH | AI |
|---|---|---|---|---|---|---|
| 1 | 1.0719E-06 | −5.7923E-11 | −2.2402E-13 | 1.9415E-16 | −6.8130E-20 | 8.9308E-24 |
| 5 | 1.1636E-06 | −5.0434E-10 | 9.6131E-12 | −1.7599E-14 | 1.7162E-17 | −5.8680E-21 |
| 6 | 1.2711E-06 | 9.8638E-09 | −3.6063E-11 | 1.0124E-13 | −1.3184E-16 | 7.2290E-20 |
| 7 | −1.2711E-06 | −9.8638E-09 | 3.6063E-11 | −1.0124E-13 | 1.3184E-16 | −7.2290E-20 |
| 8 | −1.1636E-06 | 5.0434E-10 | −9.6131E-12 | 1.7599E-14 | −1.7162E-17 | 5.8680E-21 |
| 12 | 3.2814E-08 | −7.2202E-10 | 7.5840E-13 | −9.3077E-17 | −4.2291E-19 | 2.0621E-22 |
| 14 | −7.2374E-07 | −1.6695E-10 | 2.2119E-13 | −1.0836E-16 | 2.7162E-20 | −2.7258E-24 |

SYSTEM FIRST ORDER PROPERTIES

| | | |
|---|---|---|
| OBJ. HT: −660.40 | fl: 2.40 | MAG: −0.0800 |
| EFL: 65.9971 | FVD: 294.905 | ENP: 47.4196 |
| IMD: 9.97716 | BRL: 284.928 | EXP: 1143.16 |
| OBD: −773.714 | OVL: 1068.62 | |
| STOP: 21.56 after surface 6. DIA: 46.429 | | |

TABLE 6

| SN. | RADIUS | THICKNESS | GLASS | CLR. AP. |
|---|---|---|---|---|
| 1 | 137.0489 | 5.00000 | BK7 | 74.99 |
| 2 | 31.2291 | 25.38251 | | 55.45 |
| 3a | −113.5269 | 10.00000 | STYRENE | 53.14 |
| 4a | −54.9945 | 0.27919 | | 51.38 |
| 5a | 35.0988 | 7.44470 | ACRYLIC | 41.06 |
| 6a | 27.6177 | 32.99456 | | 35.67 |
| 7a | −27.6177 | 7.44470 | ACRYLIC | 41.91 |
| 8a | −35.0988 | 0.20000 | | 49.19 |
| 9 | 131.8282 | 18.00000 | ACRYLIC | 65.15 |
| 10a | −43.7525 | 1.00000 | | 65.04 |
| 11a | −51.4270 | 7.00000 | STYRENE | 63.68 |
| 12a | −152.4864 | 0.27919 | | 68.56 |
| 13 | 182.0921 | 20.00000 | SK5 | 72.41 |
| 14 | −54.1632 | 1.00000 | | 72.95 |
| 15a | −51.4270 | 7.00000 | STYRENE | 70.79 |
| 16a | −152.4864 | 106.00550 | | 72.42 |
| 17a | 98.8869 | 15.00000 | ACRYLIC | 107.66 |
| 18 | −535.3889 | 10.00007 | | 107.59 |

EVEN POLYNOMIAL ASPHERES

| SN. | AD | AE | AF | AG | AH | AI |
|---|---|---|---|---|---|---|
| 3 | 3.4568E-06 | 6.9663E-10 | 2.6127E-12 | −2.2808E-15 | −9.7531E-19 | 8.0804E-22 |
| 4 | 5.3904E-06 | −1.1902E-09 | 1.2013E-12 | 1.2557E-15 | −6.8366E-18 | 3.1269E-21 |
| 5 | 1.0872E-06 | 4.9518E-09 | 1.3457E-11 | −1.1151E-14 | 2.3531E-17 | −2.2802E-20 |
| 6 | −3.4949E-06 | 1.5294E-08 | −1.8952E-11 | 1.2355E-13 | −8.4255E-17 | −3.7518E-20 |
| 7 | 3.4949E-06 | −1.5294E-08 | 1.8952E-11 | −1.2355E-13 | 8.4225E-17 | 3.7518E-20 |
| 8 | −1.0872E-06 | −4.9518E-09 | −1.3457E-11 | 1.1151E-14 | −2.3531E-17 | 2.2802E-20 |
| 10 | −4.1719E-08 | 1.5484E-10 | −8.0567E-14 | −2.9683E-17 | 2.9631E-20 | 1.9686E-22 |
| 11 | −9.0200E-08 | 2.5863E-10 | 3.5923E-13 | 1.8652E-16 | −1.0960E-20 | −9.8571E-23 |
| 12 | 7.9728E-07 | 4.3196E-10 | 2.6990E-14 | 1.1861E-16 | 1.3851E-19 | −1.2450E-22 |
| 15 | −9.0200E-08 | 2.5863E-10 | 3.5923E-13 | 1.8652E-16 | −1.0960E-20 | −9.8571E-23 |
| 16 | 7.9728E-07 | 4.3196E-10 | 2.6990E-14 | 1.1861E-16 | 1.3851E-19 | −1.2450E-22 |
| 17 | −2.6796E-07 | −5.5252E-10 | 2.8672E-13 | −7.5158E-17 | 1.4050E-20 | −1.3844E-24 |

SYSTEM FIRST ORDER PROPERTIES

| | | |
|---|---|---|
| OBJ. HT: −660.40 | fl: 2.60 | MAG: −0.0800 |
| EFL: 66.0000 | FVD: 274.030 | ENP: 37.2913 |
| IMD: 10.0001 | BRL: 264.030 | EXP: 832.590 |
| OBD: −782.448 | OVL: 1056.48 | |
| STOP: 16.50 after surface 6. DIA: 37.551 | | |

TABLE 7

| SN. | RADIUS | THICKNESS | GLASS | CLR. AP. |
|---|---|---|---|---|
| 1 | 135.2710 | 4.00000 | BK7 | 81.82 |
| 2 | 32.6261 | 17.79263 | | 60.30 |
| 3a | 928.2989 | 8.00000 | STYRENE | 60.02 |
| 4a | −188.2154 | 0.50000 | | 58.30 |
| 5a | 39.5052 | 8.00000 | ACRYLIC | 49.72 |
| 6a | 29.1122 | 41.85327 | | 41.46 |
| 7a | −29.1122 | 8.00000 | ACRYLIC | 44.58 |
| 8a | −39.5052 | 0.50000 | | 52.98 |
| 9 | 77.5787 | 29.60778 | ACRYLIC | 71.42 |
| 10a | −45.4335 | 0.50000 | | 72.42 |
| 11a | −57.8443 | 7.00000 | STYRENE | 69.57 |
| 12a | −218.1154 | 0.50000 | | 72.44 |
| 13 | 146.0073 | 23.00000 | SK5 | 75.52 |
| 14 | −61.4748 | 1.00000 | | 76.13 |
| 15a | −57.8443 | 7.00000 | STYRENE | 74.07 |
| 16a | −218.1154 | 107.7680 | | 75.20 |
| 17a | 113.1712 | 17.00000 | ACRYLIC | 105.00 |
| 18 | −550.0000 | 10.00180 | | 105.00 |

TABLE 7-continued

EVEN POLYNOMIAL ASPHERES

| SN. | AD | AE | AF | AG | AH | AI |
|---|---|---|---|---|---|---|
| 3 | 5.0114E-06 | −7.5514E-10 | 2.4260E-12 | −3.0219E-15 | 5.5886E-18 | −3.8759E-21 |
| 4 | 5.0095E-06 | −2.2665E-09 | 1.4239E-12 | 4.0511E-15 | −6.9969E-18 | 1.3974E-21 |
| 5 | 7.0937E-07 | 2.8241E-09 | 2.5376E-12 | −1.0416E-14 | 2.2718E-17 | −1.3796E-20 |
| 6 | −1.8225E-06 | 8.2637E-09 | −2.6049E-11 | 5.5754E-14 | −1.1258E-17 | −2.3992E-20 |
| 7 | 1.8225E-06 | −8.2637E-09 | 2.6049E-11 | −5.5754E-14 | 1.1258E-17 | 2.3992E-20 |
| 8 | −7.0937E-07 | −2.8241E-09 | −2.5376E-12 | 1.0416E-14 | −2.2718E-17 | 1.3796E-20 |
| 10 | 9.0618E-07 | 3.6080E-10 | 3.6043E-13 | −5.0548E-17 | −1.1699E-19 | 9.1943E-23 |
| 11 | 4.0369E-07 | 3.0556E-10 | −1.3767E-14 | 1.9427E-17 | −7.0592E-20 | 1.5278E-23 |
| 12 | 9.8470E-07 | 3.0898E-10 | 4.5631E-14 | −1.1394E-16 | 7.0842E-20 | −2.2792E-23 |
| 15 | 4.0369E-07 | 3.0556E-10 | −1.3767E-14 | 1.9427E-17 | −7.0592E-20 | 1.5278E-23 |
| 16 | 9.8470E-07 | 3.0898E-10 | 4.5631E-14 | −1.1394E-16 | 7.0842E-20 | −2.2792E-23 |
| 17 | −1.9051E-07 | −5.7486E-10 | 3.1763E-13 | −2.3064E-17 | −2.4265E-20 | 5.2053E-24 |

SYSTEM FIRST ORDER PROPERTIES

| | | |
|---|---|---|
| OBJ. HT: −571.50 | fl: 2.40 | MAG: −0.0889 |
| EFL: 63.6601 | FVD: 292.024 | ENP: 39.9528 |
| IMD: 10.0018 | BRL: 282.022 | EXP: 1252.22 |
| OBD: −672.976 | OVL: 964.999 | |
| STOP: 28.85 after surface 6. DIA: 42.357 | | |

TABLE 8

| SN. | RADIUS | THICKNESS | GLASS | CLR. AP. |
|---|---|---|---|---|
| 1a | −430.6481 | 6.00000 | ACRYLIC | 107.85 |
| 2 | 48.2160 | 49.80489 | | 80.00 |
| 3a | 33.1764 | 11.00000 | STYRENE | 53.50 |
| 4a | 71.0748 | 20.43078 | | 50.56 |
| 5 | Aperture stop | 9.69367 | | 36.95 |
| 6a | −27.0513 | 6.00000 | STYRENE | 36.45 |
| 7a | −97.7574 | 0.50000 | | 43.38 |
| 8 | −217.3178 | 4.00000 | SF6 | 45.12 |
| 9 | 71.5467 | 15.00000 | SK5 | 52.47 |
| 10 | −85.2621 | 1.50000 | | 58.77 |
| 11 | 113.6252 | 24.00000 | SK5 | 85.23 |
| 12 | −87.6248 | 0.50000 | | 87.02 |
| 13 | −1396.4110 | 12.00000 | ACRYLIC | 87.41 |
| 14a | −113.7844 | 106.02420 | | 87.80 |
| 15a | 144.0855 | 15.00000 | ACRYLIC | 108.71 |
| 16 | −700.0000 | 10.00063 | | 108.42 |

EVEN POLYNOMIAL ASPHERES

| SN. | AD | AE | AF | AG | AH | AI |
|---|---|---|---|---|---|---|
| 1 | 1.7265E-06 | −5.0563E-10 | 7.7902E-14 | 1.8312E-17 | −9.8919E-21 | 1.2219E-24 |
| 3 | −6.4206E-07 | −1.6867E-10 | 6.0966E-12 | −3.8355E-15 | −1.2448E-17 | 1.9858E-20 |
| 4 | 2.6200E-07 | 4.2710E-09 | −2.4430E-12 | −2.2089E-14 | 5.7230E-17 | −3.7237E-20 |
| 6 | −8.7022E-07 | −4.6900E-09 | 6.8501E-12 | −8.6392E-15 | −1.1384E-16 | 2.0230E-19 |
| 7 | −1.2079E-06 | −1.3813E-09 | 3.5311E-12 | −2.4985E-15 | −1.2281E-17 | 1.9686E-20 |
| 14 | 1.0200E-06 | 2.3230E-10 | −6.0636E-14 | 1.3854E-17 | −4.5648E-21 | 2.7866E-24 |
| 15 | −6.4501E-08 | 7.6368E-12 | −4.1252E-14 | 1.1774E-17 | 2.6866E-21 | −9.8906E-25 |

SYSTEM FIRST ORDER PROPERTIES

| | | |
|---|---|---|
| OBJ. HT: −660.40 | fl: 2.40 | MAG: −0.0800 |
| EFL: 66.1377 | FVD: 291.454 | ENP: 48.7648 |
| IMD: 10.0006 | BRL: 281.454 | EXP: −7335.50 |
| OBD: −778.552 | OVL: 1070.01 | |
| STOP: 0.00 after surface 5. DIA: 36.951 | | |

TABLE 9

| SN. | RADIUS | THICKNESS | GLASS | CLR. AP. |
|---|---|---|---|---|
| 1a | 82.0969 | 5.00000 | ACRYLIC | 56.46 |
| 2 | 28.7214 | 11.21390 | | 45.40 |
| 3 | 81.0110 | 8.00000 | SF6 | 43.94 |
| 4 | −887.3628 | 0.20000 | | 41.52 |
| 5a | 35.6781 | 7.50818 | STYRENE | 35.54 |
| 6a | 23.2152 | 30.23279 | | 27.37 |
| 7a | −23.2152 | 7.50818 | STYRENE | 27.06 |
| 8a | −35.6781 | 0.20000 | | 34.74 |
| 9 | −218.3648 | 24.00000 | FK5 | 39.13 |
| 10 | −25.2037 | 3.75409 | SF6 | 46.27 |
| 11 | −45.3202 | 0.20000 | | 57.07 |
| 12 | 114.2101 | 18.00000 | SK5 | 72.21 |
| 13 | −70.4229 | 0.20000 | | 72.72 |
| 14a | −139.1289 | 9.00000 | ACRYLIC | 71.25 |
| 15a | −61.2332 | 74.18505 | | 71.52 |

EVEN POLYNOMIAL ASPHERES

| SN. | AD | AE | AF | AG | AH | AI |
|---|---|---|---|---|---|---|
| 1 | 1.1388E-06 | −5.2355E-10 | −1.6178E-12 | 3.7438E-15 | −3.4246E-18 | 1.2570E-21 |
| 5 | −1.1687E-06 | 1.7395E-08 | −3.2445E-11 | 1.6996E-13 | −3.2950E-16 | 4.3388E-19 |
| 6 | −6.1381E-06 | 3.2753E-08 | −6.9297E-11 | −4.1770E-13 | 4.7770E-15 | −8.9615E-18 |
| 7 | 6.1381E-06 | −3.2753E-08 | 6.9297E-11 | 4.1770E-13 | −4.7770E-15 | 8.9615E-18 |
| 8 | 1.1687E-06 | −1.7395E-08 | 3.2445E-11 | −1.6996E-13 | 3.2950E-16 | −4.3388E-19 |
| 14 | −2.9437E-07 | −5.0363E-10 | 1.2027E-13 | −1.1975E-16 | 2.5254E-19 | −9.5080E-23 |
| 15 | 1.8908E-06 | −7.2759E-11 | −4.3346E-14 | −6.5028E-17 | 2.5433E-19 | −9.1037E-23 |

SYSTEM FIRST ORDER PROPERTIES

| | | |
|---|---|---|
| OBJ. HT: −317.50 | fl: 2.00 | MAG: −0.0800 |
| EFL: 42.9995 | FVD: 199.202 | ENP: 37.7574 |
| IMD: 74.1850 | BRL: 125.017 | EXP: −125100. |
| OBD: −499.751 | OVL: 698.953 | |
| STOP: 17.95 after surface 6. DIA: 24.093 | | |

TABLE 10

| SN. | RADIUS | THICKNESS | GLASS | CLR. AP. |
|---|---|---|---|---|
| 1a | 25.2237 | 2.50000 | ACRYLIC | 18.90 |
| 2 | 8.3453 | 4.06293 | | 14.11 |
| 3 | 73.7267 | 1.00000 | BK7 | 13.93 |
| 4 | 18.7852 | 4.00000 | SF6 | 13.37 |
| 5 | −47.7215 | 0.20000 | | 12.51 |
| 6a | 13.8802 | 2.00000 | ACRYLIC | 10.40 |
| 7a | 8.6569 | 7.11753 | | 8.20 |
| 8a | −8.6569 | 2.00000 | ACRYLIC | 6.78 |
| 9a | −13.8802 | 0.20000 | | 7.81 |
| 10 | −28.7358 | 1.00000 | SF6 | 8.10 |
| 11 | 10.9118 | 8.33000 | BK7 | 9.36 |
| 12 | −11.9366 | 0.20000 | | 14.66 |
| 13a | 25.8279 | 9.37000 | ACRYLIC | 18.57 |
| 14a | −12.4324 | 1.40000 | | 20.59 |
| 15 | ∞ | 31.20000 | SK5 | 18.92 |
| 16 | ∞ | 0.47810 | | 13.70 |

EVEN POLYNOMIAL ASPHERES

| SN. | AD | AE | AF | AG | AH | AI |
|---|---|---|---|---|---|---|
| 1 | 1.3074E-05 | 5.5412E-07 | −3.3729E-08 | 6.3765E-10 | −5.4661E-12 | 1.8213E-14 |
| 6 | 1.8844E-04 | 2.5379E-05 | −8.6379E-07 | 2.4831E-08 | −2.6633E-10 | 6.8303E-12 |
| 7 | 1.9187E-04 | 3.2358E-05 | 1.1808E-07 | −1.3481E-07 | 9.4399E-09 | −1.3832E-10 |
| 8 | −1.9187E-04 | −3.2358E-05 | −1.1808E-07 | 1.3481E-07 | −9.4399E-09 | 1.3832E-10 |
| 9 | −1.8844E-04 | −2.5379E-05 | 8.6379E-07 | −2.4831E-08 | 2.6633E-10 | −6.8303E-12 |
| 13 | −4.3807E-05 | −4.1408E-07 | 1.6296E-09 | −2.2920E-11 | 3.8303E-13 | −3.5993E-15 |
| 14 | 5.9546E-05 | 7.1410E-08 | −1.7909E-09 | −1.9090E-11 | 6.0683E-13 | −3.3412E-15 |

TABLE 10-continued

| SYSTEM FIRST ORDER PROPERTIES | | |
|---|---|---|
| OBJ. HT: −557.00 | fl: 2.00 | MAG: −0.0122 |
| EFL: 11.4542 | FVD: 75.0586 | ENP: 13.3134 |
| IMD: 0.478098 | BRL: 74.5805 | EXP: −14279.3 |
| OBD: −925.562 | OVL: 74.5805 | |
| STOP: 5.76 after surface 7. DIA: 6.7154 | | |

TABLE 11

| SN. | RADIUS | THICKNESS | GLASS | CLR. AP. |
|---|---|---|---|---|
| 1a | 281.6491 | 6.00000 | ACRYLIC | 51.59 |
| 2 | 34.3557 | 7.49190 | | 42.42 |
| 3 | 77.3775 | 6.00000 | SF6 | 40.94 |
| 4 | ∞ | 3.00000 | BK7 | 39.23 |
| 5 | 59.3087 | 0.20000 | | 35.58 |
| 6a | 26.2016 | 9.00000 | ACRYLIC | 33.32 |
| 7a | 27.7133 | 23.27822 | | 26.98 |
| 8 | ∞ | 28.10182 | | 14.82 |
| 9a | −27.7133 | 9.00000 | ACRYLIC | 33.30 |
| 10a | −26.2016 | 0.20000 | | 40.12 |
| 11 | −64.1761 | 14.00000 | SK5 | 44.51 |
| 12 | −30.1775 | 3.00000 | SP6 | 48.81 |
| 13 | −54.2642 | 0.20000 | | 56.09 |
| 14 | 271.8037 | 17.00000 | BK7 | 63.66 |
| 15 | −54.6869 | 0.20000 | | 65.35 |
| 16a | −110.0000 | 8.00000 | ACRYLIC | 64.68 |
| 17a | −80.0000 | 4.50000 | | 66.93 |
| 18 | ∞ | 4.50000 | BK7 | 64.69 |
| 19 | ∞ | 1.00000 | | 64.18 |
| 20 | ∞ | 55.00000 | SSK5 | 64.00 |
| 21 | ∞ | 72.33000 | SK5 | 58.23 |
| 22 | ∞ | 3.00000 | BK7 | 50.29 |
| 23 | ∞ | 0.50000 | | 49.95 |
| 24 | ∞ | 3.18000 | BK7 | 49.86 |
| 25 | ∞ | −0.09453 | | 49.51 |

EVEN POLYNOMIAL ASPHERES

| SN. | AD | AE | AF | AG | AH | AI |
|---|---|---|---|---|---|---|
| 1 | 2.7021E-06 | −4.2909E-10 | −7.4454E-13 | 1.1622E-15 | −3.5089E-19 | −1.7018E-22 |
| 6 | 1.5256E-06 | −1.1915E-09 | 3.2360E-11 | −3.5262E-13 | 1.1495E-15 | −1.2915E-18 |
| 7 | 6.4649E-06 | 4.6582E-08 | −4.6274E-10 | 1.9572E-12 | −3.0717E-15 | 1.0689E-19 |
| 9 | −6.4649E-06 | −4.6582E-08 | 4.6274E-10 | −1.9572E-12 | 3.0717E-15 | −1.0689E-19 |
| 10 | −1.5256E-06 | 1.1915E-09 | −3.2360E-11 | 3.5262E-13 | −1.1495E-15 | 1.2915E-18 |
| 16 | −8.2477E-08 | −4.9723E-10 | −6.0851E-13 | −3.0556E-16 | −1.5484E-19 | 1.4939E-22 |
| 17 | 6.0090E-07 | −5.7431E-10 | −3.7456E-13 | −2.4739E-16 | −2.6086E-20 | 7.7311E-23 |

| SYSTEM FIRST ORDER PROPERTIES | | |
|---|---|---|
| OBJ. HT: −359.20 | fl: 4.00 | MAG: −0.0689 |
| EFL: 47.9726 | FVD: 278.587 | ENP: 39.1924 |
| IMD: −.945269E-01 | BRL: 278.682 | EXP: 35216.9 |
| OBD: −657.006 | OVL: 935.593 | |
| STOP: 0.00 after surface 8. DIA: 14.775 | | |

TABLE 12

| SN. | RADIUS | THICKNESS | GLASS | CLR. AP. |
|---|---|---|---|---|
| 1a | −490.1644 | 5.00000 | ACRYLIC | 60.02 |
| 2 | 30.5001 | 16.98608 | | 47.16 |
| 3 | 47.9748 | 8.00000 | SF6 | 44.43 |
| 4 | 147.4488 | 0.20000 | | 42.06 |
| 5a | 23.7369 | 7.50818 | ACRYLIC | 35.86 |
| 6a | 20.6264 | 34.28608 | | 28.97 |

TABLE 12-continued

| | | | | |
|---|---|---|---|---|
| 7 | 523.9152 | 8.00000 | SK5 | 19.05 |
| 8 | −15.4998 | 1.00000 | F2 | 21.21 |
| 9 | 1881.4011 | 8.10173 | | 24.35 |
| 10a | −20.6264 | 7.50818 | ACRYLIC | 27.29 |
| 11a | −23.7369 | 0.20000 | | 34.29 |
| 12 | −56.2662 | 15.00000 | FK5 | 38.40 |
| 13 | −25.3606 | 3.00000 | NBFD10 | 43.58 |
| 14 | −39.6161 | 0.20000 | | 50.92 |
| 15a | 108.2844 | 18.00000 | ACRYLIC | 62.68 |
| 16a | −43.0795 | 1.00000 | | 63.55 |
| 17 | ∞ | 120.00000 | SK5 | 61.78 |
| 18 | ∞ | 0.96650 | | 50.95 |

EVEN POLYNOMIAL ASPHERES

| SN. | AD | AE | AF | AG | AH | AI |
|---|---|---|---|---|---|---|
| 1 | 3.6956E-06 | −2.0636E-09 | 1.1625E-13 | 2.0365E-15 | −2.5214E-18 | 1.0960E-21 |
| 5 | 5.4411E-08 | 5.7772E-09 | 1.4208E-10 | −1.0278E-12 | 3.6326E-15 | −3.9867E-18 |
| 6 | −1.0290E-06 | 8.6170E-08 | −1.0754E-09 | 6.1660E-12 | −1.1913E-14 | 6.1467E-18 |
| 10 | 1.0290E-06 | −8.6170E-08 | 1.0754E-09 | −6.1660E-12 | 1.1913E-14 | −6.1467E-18 |
| 11 | −5.4411E-08 | 5.7772E-09 | −1.4208E-10 | 1.0278E-12 | −3.6326E-15 | 3.9867E-18 |
| 15 | 2.0070E-08 | −3.2885E-10 | −2.2938E-13 | 2.6744E-16 | −1.3675E-19 | 1.8952E-23 |
| 16 | 2.0828E-06 | 5.4647E-10 | −1.6157E-15 | −2.1816E-16 | 3.2489E-19 | −1.2073E-22 |

SYSTEM FIRST ORDER PROPERTIES

| | | |
|---|---|---|
| OBJ. HT: −317.50 | fl: 4.00 | MAG: −0.0800 |
| EFL: 42.9997 | FVD: 254.957 | ENP: 40.3017 |
| IMD: 0.966499 | BRL: 253.990 | EXP: 29407.9 |
| OBD: −497.132 | OVL: 752.089 | |
| STOP: −22.18 after surface 8. DIA: 13.044 | | |

TABLE 13

| SN. | RADIUS | THICKNESS | GLASS | CLR. AP. |
|---|---|---|---|---|
| 1a | 570.3171 | 5.00000 | ACRYLIC | 54.10 |
| 2 | 31.9481 | 13.60849 | | 43.71 |
| 3 | 64.3459 | 6.00000 | SF6 | 39.79 |
| 4 | 162.9577 | 0.20000 | | 37.59 |
| 5a | 23.3904 | 7.50818 | STYRENE | 32.55 |
| 6a | 20.8846 | 43.31920 | | 25.76 |
| 7a | −20.8846 | 7.50818 | STYRENE | 28.40 |
| 8a | −23.3904 | 0.20000 | | 35.51 |
| 9 | −63.5258 | 15.00000 | SK5 | 40.56 |
| 10 | −24.2464 | 3.00000 | SF6 | 44.03 |
| 11 | −47.5492 | 0.20000 | | 53.60 |
| 12a | 118.4054 | 18.00000 | ACRYLIC | 64.24 |
| 13a | −42.3194 | 1.00000 | | 64.99 |
| 14 | ∞ | 120.00000 | SK5 | 62.82 |
| 15 | ∞ | 0.97044 | | 50.97 |

EVEN POLYNOMIAL ASPHERES

| SN. | AD | AE | AF | AG | AH | AI |
|---|---|---|---|---|---|---|
| 1 | 3.5234E-06 | −2.1582E-09 | 1.0051E-13 | 2.2823E-15 | −2.6612E-18 | 1.1080E-21 |
| 5 | 4.1438E-07 | −2.6927E-09 | 1.4331E-10 | −1.0171E-12 | 3.6740E-15 | −4.2041E-18 |
| 6 | 9.6270E-07 | 9.1133E-08 | −1.0091E-09 | 6.2227E-12 | −1.2776E-14 | 7.3793E-18 |
| 7 | −9.6270E-07 | −9.1133E-08 | 1.0091E-09 | −6.2227E-12 | 1.2776E-14 | −7.3793E-18 |
| 8 | −4.1438E-07 | 2.6927E-09 | −1.4331E-10 | 1.0171E-12 | −3.6740E-15 | 4.2041E-18 |
| 12 | −7.3105E-08 | −4.0309E-10 | −2.9597E-13 | 1.8337E-16 | −1.8251E-19 | 4.9644E-23 |
| 13 | 1.8625E-06 | 5.9249E-10 | −6.5396E-14 | −2.9205E-16 | 2.6928E-19 | −1.5540E-22 |

SYSTEM FIRST ORDER PROPERTIES

| | | |
|---|---|---|
| OBJ. HT: −317.50 | fl: 4.00 | MAG: −0.0800 |
| EFL: 42.9986 | FVD: 241.514 | ENP: 36.9733 |
| IMD: 0.970439 | BRL: 240.544 | EXP: 83338.6 |
| OBD: −500.487 | OVL: 742.002 | |
| STOP: −20.66 after surface 6. DIA: 12.825 | | |

TABLE 14

| SN. | RADIUS | THICKNESS | GLASS | CLR. AP. |
|---|---|---|---|---|
| 1a | −256.3043 | 5.12507 | ACRYLIC | 38.68 |
| 2 | 25.8020 | 16.91454 | | 32.83 |
| 3 | 57.0870 | 5.97924 | SP11 | 32.44 |
| 4 | 314.5539 | 0.17084 | | 31.33 |
| 5a | 27.3894 | 7.14803 | ACRYLIC | 29.45 |
| 6a | 31.8678 | 22.44155 | | 25.28 |
| 7 | Aperture stop | 11.95012 | | 16.02 |
| 8 | −374.6280 | 7.00000 | FK52 | 21.41 |
| 9 | −16.9616 | 1.00000 | K2FS4 | 22.61 |
| 10 | −225.3529 | 3.20881 | | 25.18 |
| 11a | −31.8678 | 7.14803 | ACRYLIC | 25.59 |
| 12a | −27.3894 | 0.17084 | | 30.27 |
| 13 | −35.1092 | 2.56253 | K2FS4 | 31.20 |
| 14 | 54.9984 | 15.00000 | FK52 | 38.26 |
| 15 | −46.5677 | 0.17084 | | 43.81 |
| 16 | 78.5015 | 15.00000 | SK5 | 52.30 |
| 17 | −51.5058 | 0.20000 | | 52.92 |
| 18a | −100.0000 | 7.00000 | ACRYLIC | 51.34 |
| 19a | −80.0000 | 0.85418 | | 51.17 |
| 20 | ∞ | 46.97978 | SSK5 | 50.15 |
| 21 | ∞ | 71.75093 | SK5 | 43.32 |
| 22 | ∞ | 0.42709 | | 32.42 |
| 23 | ∞ | 2.76754 | K5 | 32.32 |
| 24 | ∞ | −0.00139 | | 31.88 |

EVEN POLYNOMIAL ASPHERES

| SN. | AD | AE | AF | AG | AH | AI |
|---|---|---|---|---|---|---|
| 1 | 6.2110E-06 | −3.8544E-09 | −4.3180E-12 | 2.5385E-14 | −5.1475E-17 | 4.9727E-20 |
| 5 | 3.7087E-06 | 1.2867E-08 | 1.0134E-10 | −1.0412E-12 | 6.7191E-15 | −1.3018E-17 |
| 6 | 6.0690E-06 | 7.9141E-08 | −9.6884E-10 | 8.0294E-12 | −2.2874E-14 | 1.3079E-17 |
| 11 | −6.0690E-06 | −7.9141E-08 | 9.6884E-10 | −8.0294E-12 | 2.2874E-14 | −1.3079E-17 |
| 12 | −3.7087E-06 | −1.2867E-08 | −1.0134E-10 | 1.0412E-12 | −6.7191E-15 | 1.3018E-17 |
| 18 | −3.5771E-08 | −7.9681E-10 | −2.2928E-12 | 1.3144E-15 | −1.0852E-18 | 1.9977E-21 |
| 19 | 2.5145E-06 | −7.4160E-10 | 6.8492E-13 | −2.5957E-15 | 1.0395E-18 | 1.9495E-21 |

SYSTEM FIRST ORDER PROPERTIES

| | | |
|---|---|---|
| OBJ. HT: −279.40 | fl: 3.33 | MAG: −0.0570 |
| EFL: 40.9984 | FVD: 250.969 | ENP: 33.7610 |
| IMD: −1.39194E-02 | BRL: 250.970 | EXP: −17586.0 |
| OBD: −685.605 | OVL: 936.574 | |
| STOP: 0.00 after surface 7. DIA: 16.008 | | |

TABLE 15

| SN. | RADIUS | THICKNESS | GLASS | CLR. AP. |
|---|---|---|---|---|
| 1a | 260.9710 | 5.12507 | ACRYLIC | 42.31 |
| 2 | 25.6475 | 19.11514 | | 35.39 |
| 3 | 47.2190 | 5.97924 | SF11 | 33.32 |
| 4 | 67.5626 | 0.17084 | | 31.38 |
| 5a | 25.4264 | 7.14803 | STYRENE | 30.15 |
| 6a | 30.1914 | 48.40961 | | 25.95 |
| 7a | −30.1914 | 7.14803 | STYRENE | 26.42 |
| 8a | −25.4264 | 0.17084 | | 30.85 |
| 9 | −31.4535 | 2.56253 | SF5 | 31.48 |
| 10 | 50.0514 | 15.00000 | SK5 | 39.00 |
| 11 | −72.6714 | 0.17084 | | 45.09 |
| 12 | 69.0035 | 15.00000 | SK5 | 53.47 |
| 13 | −49.8407 | 0.20000 | | 53.76 |
| 14a | −100.0000 | 7.00000 | ACRYLIC | 51.80 |
| 15a | −80.0000 | 0.85418 | | 51.84 |
| 16 | ∞ | 46.97978 | SSK5 | 50.72 |
| 17 | ∞ | 71.75093 | SK5 | 43.67 |
| 18 | ∞ | 0.42709 | | 32.43 |
| 19 | ∞ | 2.76754 | K5 | 32.32 |
| 20 | ∞ | 0.00529 | | 31.87 |

TABLE 15-continued

| EVEN POLYNOMIAL ASPHERES | | | | | | |
|---|---|---|---|---|---|---|
| SN. | AD | AE | AF | AG | AH | AI |
| 1 | 5.3384E-06 | −7.9525E-10 | −7.5835E-12 | 1.6616E-14 | −1.9565E-17 | 1.6420E-20 |
| 5 | 2.6012E-07 | 8.8368E-09 | 1.0831E-10 | −1.0908E-12 | 6.9609E-15 | −1.3602E-17 |
| 6 | 3.9652E-06 | 9.1183E-08 | −1.0645E-09 | 8.3839E-12 | −2.2080E-14 | 8.4275E-18 |
| 7 | −3.9652E-06 | −9.1183E-08 | 1.0645E-09 | −8.3839E-12 | 2.2080E-14 | −8.4275E-18 |
| 8 | −2.6012E-07 | −8.8368E-09 | −1.0831E-10 | 1.0908E-12 | −6.9609E-15 | 1.3602E-17 |
| 14 | −7.0826E-07 | −1.2109E-09 | −2.6870E-12 | 9.5720E-16 | −1.3980E-18 | 2.1217E-21 |
| 15 | 2.2587E-06 | −6.8697E-10 | 7.6586E-13 | −2.9386E-15 | 2.4725E-19 | 2.2444E-21 |

| SYSTEM FIRST ORDER PROPERTIES | | |
|---|---|---|
| OBJ. HT: −279.40 | fl: 3.33 | MAG: −0.0570 |
| EFL: 41.0016 | FVD: 255.985 | ENP: 38.9501 |
| IMD: 0.528695E-02 | BRL: 255.980 | EXP: −7950.90 |
| OBD: −680.588 | OVL: 936.573 | |
| STOP: 25.77 after surface 6. DIA: 16.215 | | |

TABLE 16

| MATERIALS TABLE | | |
|---|---|---|
| Name | $N_o$ | $V_o$ |
| Acrylic | 1.4938 | 56.9 |
| Styrene | 1.5949 | 30.7 |
| SK5 | 1.5914 | 61.0 |
| SF6 | 1.8126 | 25.2 |
| SF14 | 1.7686 | 26.3 |
| BK7 | 1.5187 | 63.9 |
| F2 | 1.6241 | 36.1 |
| SF11 | 1.7919 | 25.5 |
| FK52 | 1.4874 | 81.4 |
| KZFS4 | 1.6167 | 44.1 |
| SSK5 | 1.6615 | 50.6 |
| K5 | 1.5246 | 59.2 |
| SF5 | 1.6776 | 31.9 |
| NBFD10 | 1.8393 | 37.1 |
| FK5 | 1.4891 | 70.2 |

TABLE 17

| Ex. No. | Field | F/No | f | $f_1$ | $f_2$ | $f_3$ | ASOD | ENPD | ASOD/f |
|---|---|---|---|---|---|---|---|---|---|
| 1 | 38.8° | 2.4 | 65.61 | −74.33 | −804.19 | 79.61 | 209.76 | −13189.8 | 3.2 |
| 2 | 38.8° | 2.4 | 66.00 | −101.66 | 403.81 | 88.48 | 192.91 | 933.9 | 2.9 |
| 3 | 38.8° | 2.4 | 65.65 | −81.46 | −523.66 | 78.88 | 208.40 | −11068.7 | 3.2 |
| 4 | 38.6° | 2.6 | 66.19 | −60.07 | 529.72 | 81.76 | 202.18 | −6205.6 | 3.1 |
| 5 | 38.8° | 2.4 | 66.00 | −75.56 | 184.44 | 113.70 | 199.23 | 1143.2 | 3.0 |
| 6 | 38.9° | 2.6 | 66.00 | −79.25 | 665.38 | 111.01 | 209.42 | 832.6 | 3.2 |
| 7 | 38.8° | 2.4 | 63.37 | −84.01 | −468.50 | 110.74 | 223.92 | 1282.9 | 3.5 |
| 8 | 38.6° | 2.4 | 66.14 | −87.45 | 563.82 | 79.21 | 204.21 | −7335.5 | 3.1 |
| 9 | 30.6° | 2.0 | 43.00 | −92.37 | 1671.63 | 47.84 | 149.33 | −125100.0 | 3.5 |
| 10 | 30.7° | 2.0 | 11.45 | −26.57 | 96.26 | 13.76 | 55.54 | −14279.3 | 4.9 |
| 11 | 27.3° | 4.0 | 47.97 | −79.88 | 155.64 | 73.82 | 223.71 | 35216.9 | 4.7 |
| 12 | 30.6° | 4.0 | 43.00 | −58.00 | 90.84 | 57.29 | 197.12 | 29407.9 | 4.6 |
| 13 | 30.6° | 4.0 | 43.00 | −68.79 | 120.70 | 58.89 | 186.53 | 83338.6 | 4.3 |
| 14 | 21.2° | 3.3 | 41.00 | −47.19 | 71.64 | 57.96 | 193.19 | −17586.0 | 4.7 |
| 15 | 21.2° | 3.3 | 41.00 | −58.00 | 84.11 | 70.56 | 192.67 | −7950.9 | 4.7 |

What is claimed is:

1. A telecentric lens system having an aperture stop and a telecentric pupil, said system comprising in order from its long conjugate side to its short conjugate side:

(a) a first lens unit which has a negative power and comprises a negative lens element whose strongest surface is convex to the long conjugate side of the system;

(b) a second lens unit which is of weak optical power and comprises two meniscus elements whose concave surfaces face each other, the system's aperture stop being located between the meniscus elements and each meniscus element having at least one aspheric surface; and (c) a third lens unit which has a positive power and comprises means for correcting the chromatic aberrations of the system, said third lens unit forming the system's telecentric pupil by imaging the aperture stop.

2. The telecentric lens system of claim 1 wherein the negative lens element of the first lens unit is meniscus shaped.

3. The telecentric lens system of claim 1 wherein the negative lens element of the first lens unit is located at the long conjugate end of the lens system.

4. The telecentric lens system of claim 1 wherein the negative lens elements of the first lens unit is composed of a low dispersion material.

5. The telecentric lens system of claim 1 wherein the first lens unit includes at least one aspheric surface.

6. The telecentric lens system of claim 1 wherein the first lens unit contains only negative lens elements.

7. The telecentric lens system of claim 1 wherein the second lens unit comprises a positive lens element associated with the meniscus element nearest the long conjugate side of the system and located on the long conjugate side of that meniscus element.

8. The telecentric lens system of claim 7 wherein said positive lens element is composed of a high dispersion material.

9. The telecentric lens system of claim 7 wherein said positive lens elements is a cemented doublet.

10. The telecentric lens system of claim 7 wherein said positive lens element has at least one aspheric surface.

11. The telecentric lens system of claim 1 wherein the second lens unit comprises a color correcting doublet.

12. The telecentric lens system of claim 11 wherein the color correcting doublet is located in the vicinity of the lens system aperture stop so that the doublet corrects axial color without significantly correcting lateral color.

13. The telecentric lens system of claim 1 wherein the color correcting means of the third lens unit comprises a color correcting doublet.

14. The telecentric lens system of claim 1 wherein the color correcting means of the third lens unit comprises a doublet which consists of a positive lens element composed of a first low dispersion material and a negative lens element composed of a second low dispersion material.

15. The telecentric lens system of claim 1 wherein the third lens unit includes at least one aspheric surface.

16. The telecentric lens system of claim 1 wherein the third lens unit provides the majority of the positive power of the lens system.

17. A projection television system comprising a pixelized panel, a screen, and a lens system for forming an image of the pixelized panel on the screen, said lens system having an aperture stop and a telecentric pupil, and the distance between the aperture stop and the pixelized panel being at least about 2.5 times the lens system's focal length, wherein the lens system comprises, in order from its long conjugate side to its short conjugate side:

(a) first lens unit which has a negative power and comprises a negative lens element whose strongest surface is convex to the long conjugate side of the system;

(b) a second lens unit which is of weak optical power and comprises two meniscus elements whose concave surfaces face each other, the system's aperture stop being located between the meniscus elements and each meniscus element having at least one aspheric surface; and (c) third lens unit which has a positive power and comprises means for correcting the chromatic aberrations of the system, said third lens unit forming the system's telecentric pupil by imaging the aperture stop.

18. The projection television system of claim 17 wherein the second lens unit comprises means for correcting the chromatic aberrations of the lens system.

*19. A projection lens system comprising a pixelized panel, a screen, and a projection lens for forming an image of the pixelized panel on the screen, said projection lens comprising a lens element composed of a material, other than an acrylic plastic, having an abnormal partial dispersion, wherein said lens element reduces the secondary lateral color of the projection lens.*

*20. The projection lens system of claim 19 wherein the lateral color at the pixelized panel over the visual spectrum is less than about a diagonal of a pixel.*

*21. The projection lens system of claim 19 wherein the lateral color at the pixelized panel over the visual spectrum is less than about one-half the diagonal of a pixel.*

*22. The projection lens system of claim 19 wherein the projection lens has a short conjugate side in the direction of the pixelized panel and is telecentric on said short conjugate side.*

*23. The projection lens system of claim 19 wherein the projection lens further comprises a first lens element nearest to the screen and a second lens element nearest to the pixelized panel, each of said lens elements comprising an aspheric surface.*

*24. The projection lens system of claim 23 wherein the first lens element has a negative power.*

*25. The projection lens system of claim 24 wherein the first lens element is meniscus-shaped.*

*26. The projection lens system of claim 24 wherein the strongest surface of the first lens element is convex to the screen.*

*27. The projection lens system of claim 19 wherein the projection lens further comprises a negative lens element and a positive lens element, the dispersion of the negative lens element being less than the dispersion of the positive lens element.*

*28. The projection lens system of claim 19 wherein the projection lens further comprises a negative lens element and a positive lens element, the dispersion of the negative lens element being carrier greater than the dispersion of the positive lens element.*

*29. The projection lens system of claim 19 wherein the projection lens has an aperture stop and the distance between the aperture stop and the pixelized panel is at least about 2.5 times the projection lens' focal length.*

*30. A projection lens system comprising a pixelized panel, a screen, and a projection lens for forming an image of the pixelized panel on the screen, said projection lens comprising:*

*(a) a first lens unit which has a negative power and comprises a negative lens element,*

*(b) a second lens unit which is of weak optical power, and*

*(c) a third lens unit which has a positive power, said third lens unit comprising color correcting means for correcting the chromatic aberrations of the lens system, said color correcting means comprising a material, other than an acrylic plastic, having an abnormal partial dispersion;*

*wherein said color correcting means reduces the secondary lateral color of the projection lens.*

*31. The projection lens system of claim 30 wherein the lateral color at the pixelized panel over the visual spectrum is less than about a diagonal of a pixel.*

*32. The projection lens system of claim 30 wherein the lateral color at the pixelized panel over the visual spectrum is less than about one-half the diagonal of a pixel.*

*33. The projection lens system of claim 30 wherein the projection lens has a short conjugate side in the direction of the pixelized panel and is telecentric on said short conjugate side.*

*34. The projection lens system of claim 30 wherein the strongest surface of the negative lens element is convex to the screen.*

*35. The projection lens system of claim 30 wherein the negative lens element is meniscus-shaped.*

*36. The projection lens system of claim 30 wherein the negative lens element is located at the screen end of the projection lens.*

*37. The projection lens system of claim 30 wherein the negative lens element is composed of a low dispersion material.*

*38. The projection lens system of claim 30 wherein the first lens unit comprises an aspheric surface.*

*39. The projection lens system of claim 30 wherein the first lens unit contains only negative lens elements.*

*40. The projection lens system of claim 30 wherein the third lens unit comprises an aspheric surface.*

*41. The projection lens system of claim 30 wherein the projection lens has an aperture stop and the distance between the aperture stop and the pixelized panel is at least about* 2.5 times the projection lens' focal length.

*42. A projection lens for forming an image of an object which (a) has a short conjugate side and a long conjugate, side, (b) is telecentric on said short conjugate side, and (c) comprises a lens element composed of a material, other than an acrylic plastic, having an abnormal partial dispersion, wherein said lens element reduces the secondary lateral color of the projection lens.*

*43. The projection lens of claim 42 wherein the projection lens further comprises a first lens element at the long conjugate side and a second lens element at the short conjugate side, each of said lens elements comprising an aspheric surface.*

*44. The projection lens of claim 43 wherein the first lens element has a negative power.*

*45. The projection lens of claim 44 wherein the first lens element is meniscus-shaped.*

*46. The projection lens system of claim 44 wherein the strongest surface of the first lens element is convex to the long conjugate.*

*47. The projection lens of claim 42 wherein the lens further comprises a negative lens element and a positive lens element, the dispersion of the negative lens element being less than the dispersion of the positive lens element.*

*48. The projection lens of claim 42 wherein the lens further comprises a negative lens element and a positive lens element, the dispersion of the negative element being greater than the dispersion of the positive lens element.*

*49. A projection lens for forming an image of an object which (a) has a short conjugate side and a long conjugate side, (b) is telecentric on said short conjugate side, and (c) comprises:*

*(i) a first lens unit which has a negative power and comprises a negative lens element,*

*(ii) a second lens unit which is of weak optical power, and*

*(iii) a third lens unit which has a positive power, said third lens unit comprising color correcting means for correcting the chromatic aberrations of the lens system, said color correcting means comprising a material, other than an acrylic plastic, having an abnormal partial dispersion;*

*wherein said color correcting means reduces the secondary lateral color of the projection lens.*

*50. The projection lens of claim 49 wherein the strongest surface of the negative lens element is convex to the long conjugate.*

*51. The projection lens of claim 49 wherein the negative lens element is meniscus-shaped.*

*52. The projection lens of claim 49 wherein the negative lens element is located at the long conjugate end of the lens.*

*53. The projection lens of claim 49 wherein the negative lens element is composed of a low dispersion material.*

*54. The projection lens of claim 49 wherein the first lens unit comprises an aspheric surface.*

*55. The projection lens of claim 49 wherein the first lens unit contains only negative lens elements.*

*56. The projection lens of claim 49 wherein the third lens unit comprises an aspheric surface.*

* * * * *

UNITED STATES PATENT AND TRADEMARK OFFICE

CERTIFICATE OF CORRECTION

PATENT NO. : RE 39,424 E 
APPLICATION NO. : 09/305780
DATED : December 12, 2006
INVENTOR(S) : Jacob Moskovich It is certified that error appears in the above-identified patent and that said Letters Patent is hereby corrected as shown below:

In Column 3, line 11, before "objective" delete "A" and insert -- An --, therefor.

In Column 6, line 25, (Approx.), delete "situation.." and insert -- situation, --, therefor.

In Column 7, line 13, delete "CLR," and insert -- CLR. --, therefor.

In Column 8, in Table 1, line 2, delete "1" and insert-- 1a --, therefor.

In Column 8, in Table 1, line 8, delete "Aperature" and insert -- Aperture --, therefor.

In Column 8, in Table 1, line 13, delete "SP6 and insert -- SF6 --, therefor.

In Column 8, in Table 1, line 20, delete "l8a" and insert -- 18 --, therefor.

In Column 9, in Table 1, line 6, delete "1.1805E-12" and insert -- 1.1806E-12--, therefor, In Column 9, in Table 1, line 12, delete "4.4279E-25" and insert -- 4.2479E-25 --, therefor, In Column 9, in Table 2, line 23, delete "4.7913E-10" and insert -- 4.7943E-10 --, therefor.

In Column 11, in Table 3, line 7, delete "Aperature" and insert -- Aperture --, therefor.

In Column 11, in Table 3, line 17, delete "108.92" and insert -- 108.82 --, therefor.

In Column 11, in Table 3, line 23, delete "1.2154E-20" and insert -- 1.2514E-20 --, therefor.

In Column 11, in Table 4, line 8, delete "Aperature" and insert -- Aperture --, therefor.

In Column 11, in Table 4, line 20, delete "18a" and insert -- 18 -- therefor.

In Column 13, in Table 4, line 9, delete "1.7106E-11" and insert -- 1.7108E-11 --, therefor.

In column 13, in Table 5, line 16, delete "-533.3889" and insert -- -535.3889 --, therefor.

UNITED STATES PATENT AND TRADEMARK OFFICE

CERTIFICATE OF CORRECTION

PATENT NO. : RE 39,424 E
APPLICATION NO. : 09/305780
DATED : December 12, 2006
INVENTOR(S) : Jacob Moskovich It is certified that error appears in the above-identified patent and that said Letters Patent is hereby corrected as shown below:

In Column 15, in Table 6, line 6, delete "41.06" and insert -- 41.08 --, therefor.

In Column 15, in Table 6, line 26, delete "8.4225E-17" and insert -- 8.4255E-17 --, therefor.

In Column 15, in Table 7, line 17, delete "107.7680" and insert -- 107.76800 --, therefor.

In Column 17, in Table 8, line 22, delete "-6.4206E07" and insert -- -6.4208E-07 --, therefor.

In Column 19, in Table 10, line 4, delete "73.7267" and insert -- 73.7767 --, therefor.

In Column 21, in Table 10, line 5, delete "OVL: 74.5805" and insert -- OVL: 1000.62--, therefor.

In Column 21, in Table 11, line 13, delete "SP6" and insert -- SF6 --, therefor.

In Column 23, in Table 13, line 24, delete "4.9644E-23" and insert -- 4.9664E-23 --, therefor.

In Column 23, in Table 13, line 31, delete "-20.66" and insert --20.66 --, therefor.

In Column 25, In Table 14, line 4, delete "SP11" and insert -- SF11 --, therefor.

In Column 25, in Table 14, line 11, delete "K2FS4" and insert -- KZFS4 --, therefor.

In Column 25, In Table 14, line 15, delete "K2FS4" and insert -- KZFS4 --, therefor.

In Column 27, in Table 16, line 2, delete "$N_0$" and insert -- $N_e$ -- therefor.

In Column 27, in Table 16, line 2, delete "$V_0$" and insert -- $V_e$ -- therefor.

In Column 29, line 2, in Claim 4, delete "elements" and insert -- element --, therefor.

In Column 29, line 16, in Claim 9, delete "elements" and insert -- element --, therefor.

In Column 30, line 32, in Claim 28, after "being" delete "carrier".

UNITED STATES PATENT AND TRADEMARK OFFICE

CERTIFICATE OF CORRECTION

PATENT NO. : RE 39,424 E
APPLICATION NO. : 09/305780
DATED : December 12, 2006
INVENTOR(S) : Jacob Moskovich It is certified that error appears in the above-identified patent and that said Letters Patent is hereby corrected as shown below:

In Column 31, line 18, in Claim 42, delete "conjugate," and insert -- conjugate --, therefor.

In Column 32, line 5, in Claim 48, after "negative" insert -- lens --.

In Column 32, line 28, in Claim 53, after "projection lens" insert -- system --.

In Column 32, line 30, in Claim 54, after "projection lens" insert -- system --.

In Column 32, line 32, in Claim 55, after "projection lens" insert -- system --.

In Column 32, line 34, in Claim 56, after "projection lens" insert -- system --.

Signed and Sealed this

Third Day of April, 2007

JON W. DUDAS
*Director of the United States Patent and Trademark Office*